(12) United States Patent
Gardner et al.

(10) Patent No.: US 7,765,034 B2
(45) Date of Patent: Jul. 27, 2010

(54) LOCATION DETERMINATION OF POWER SYSTEM DISTURBANCES BASED ON FREQUENCY RESPONSES OF THE SYSTEM

(75) Inventors: Robert Matthew Gardner, Blacksburg, VA (US); Zhian Zhong, Louisville, KY (US); Yilu Liu, Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 0 days.

(21) Appl. No.: 12/363,049

(22) Filed: Jan. 30, 2009

(65) Prior Publication Data

US 2009/0198383 A1    Aug. 6, 2009

Related U.S. Application Data

(62) Division of application No. 11/588,247, filed on Oct. 27, 2006, now Pat. No. 7,519,454.

(51) Int. Cl.
  *G05D 3/12* (2006.01)
(52) U.S. Cl. .............. 700/286; 700/292; 700/294; 701/1; 701/2; 702/60; 702/63; 324/76.11; 324/157; 713/340
(58) Field of Classification Search .............. 701/1–2, 701/14; 700/286, 292, 294; 702/60, 63; 324/76.11, 157; 713/340
See application file for complete search history.

(56) References Cited

U.S. PATENT DOCUMENTS 2,521,130 A * 9/1950 Scherbatskoy .............. 367/49
2,521,623 A * 9/1950 Arndt, Jr. et al. ............ 324/112
2,579,831 A * 12/1951 Keinath ..................... 346/33 R
2,599,064 A * 6/1952 Minton ........................ 367/43
2,620,890 A * 12/1952 Lee et al. ...................... 367/43
2,649,579 A * 8/1953 Alexander .................. 367/181

(Continued)

FOREIGN PATENT DOCUMENTS

WO    WO 2007070255 A2    6/2007

OTHER PUBLICATIONS

.J. Kirby et al., "Frequency Control Concerns in the North American Electric Power System," ORNL/TM-2203/41, paper prepared for the U.S. Department of Energy, Dec. 2002, 19 pages, Oak Ridge National Library, Oak Ridge Tennessee. cited by other.*

(Continued)

*Primary Examiner*—Cuong Nguyen
(74) *Attorney, Agent, or Firm*—Blank Rome LLP

(57) ABSTRACT

A system for detecting and locating a disturbance event within a power grid includes a series of frequency disturbance recorders (FDRs) taking measurements in the power grid at dispersed points of the power grid, an information management system, configured to receive data from the series of FDRs and analyze the received data and a communications network interconnecting the series of FDRs and the information management system. The information management system is configured to examine orders and patterns of receipt of frequency changes at the FDRs in the data caused by the disturbance event and to triangulate a location of the disturbance event based on the orders and patterns of receipt of the frequency changes. Example methods of detection and location of disturbance events are also described.

15 Claims, 27 Drawing Sheets

U.S. PATENT DOCUMENTS

| | | | | |
|---|---|---|---|---|
| 2,926,739 | A | * | 3/1960 | Shoemaker ................... 367/55 |
| 6,801,162 | B1 | * | 10/2004 | Eckenroth et al. ........... 342/418 |
| 7,519,454 | B2 | * | 4/2009 | Gardner et al. .............. 700/286 |
| 7,571,028 | B2 | * | 8/2009 | Lapinski et al. ............. 700/286 |
| 2006/0235574 | A1 | * | 10/2006 | Lapinski et al. ............. 700/286 |
| 2007/0150114 | A1 | * | 6/2007 | Gardner et al. .............. 700/286 |
| 2009/0198383 | A1 | * | 8/2009 | Gardner et al. .............. 700/286 |

OTHER PUBLICATIONS

Johan Driesen et al., "Time-Frequency Analysis in Power Measurement Using Complex Wavelets," Jul. 2, 2002, pp. 681-684, IEEE. cited by other.*

Miroslav M. Begovic et al., "Frequency Tracking in Power Networks in the Presence of Harmonics," Apr. 1993, pp. 480-486, vol. 8, No. 2, IEEE. cited by other.*

A. G. Phadke, "Synchronized Phasor Measurements—A Historical Overview," Apr. 2, 2002, pp. 476-479, IEEE. cited by other.*

Arana, A.J. et al., Estimating Speed of Frequency Disturbance Propagation Through Transmission and Distribution Systems, PSCE 2006, IEEE, 1286-1290 (2006).

Bank, J.N. et al., Generator Trip Identification Using Wide-Area Measurements and Historical Data Analysis, PSCE 2006, IEEE, 1677-1681 (2006).

Gardner, R.M. and Liu, Y., FNET: A Quickly Deployable and Economic System to Monitor the Electric Grid [No Publication Data Available].

Gardner, R.M. et al., Non-Parametric Power System Event Location Using Wide-Area Measurements, PSCE 2006, IEEE, 1668-1675 (2006).

Gardner, R.M. et al., Power System Event Location Analysis Using Wide-Area Measurements, IEEE, 1-7 (2006).

Manitoba-HVDC Research Centre, User's Guide on the use of PSCAD, Version 4.1.0, third printing (Apr. 30, 2004).

Qiu, B. et al., Internet Based Power System Frequency Monitoring Network (FNET), IEEE, 1166-1171(2001).

Tsai, S-J.S. et al., Frequency Visualization in Large Electric Power Systems, IEEE, 1-7 (2005).

Tsai, S-J.S. et al., Study of Global Frequency Dynamic Behavior of Large Power Systems, IEEE, 1-8 (2004).

Wang, J.K. et al., Analysis of System Oscillations using Wide-Area Measurements, IEEE, 1-6 (2006).

Xu, C. et al., Practical Issues in Frequency Disturbance Recorder Design for Wide-Area Monitoring, Electrical Power Quality and Utilization Journal, XI(1):69-76 (2005).

Zhang, L. et al., Bulk Power system Low Frequency Oscillation Suppression by FACTS/ESS, IEEE, 1-8 (2004).

Zhong, Z. et al., Power System Frequency Monitoring Network (FNET) Implementation, IEEE, pp. 1914-1921 (2005).

Zuo, J. et al., Off-Line Event Filter for Wide-Area Frequency Measurements, IEEE, 1-6 (2006).

Chen, Jian, Accurate Frequency Estimation with Phasor Angles, Dept. of Electrical Engineering, Blacksburg, Virginia Tech University, Apr. 1994.

Qiu, Bin et al., Information Management System for an Internet Based Power System Frequency Monitoring Network, Proceedings of the North American Power Syn., College Station, TA, Oct. 2001.

Tsai, Shu-Jen Steven et al., Frequency Dynamic Behavior of Large Power Systems, 2nd International Conference on Critical Infrastructures, Grenoble, France, Oct. 25-27, 2004.

Dong, Jingyuan, Analysis of Power System Disturbances Based on Wide-Area Frequency Measurements, Power Engineering Society General Meeting, 2007, IEEE Jun. 24-28, 2007, pp. 1-8, Digital Object Identifier 10.1109/PES.2007.385654.

Xia, Tao, Wide-area Frequency Based Event Location Estimation, Power Engineering Society General Meeting, 2007. IEEE, Jun. 24-28, 2007, pp. 1-7, Digital Object Identifier 10.1109/PSCE.2006.296291.

Yilu Liu, A US-Wide Power Systems Frequency Monitoring Network, Power Systems Conference and Exposition, 2006, PSCE '06. 2006 IEEE PES, Oct. 29, 2006-Nov. 1, 2006, pp. 159-166, Digital Object Identifier 10.1109/PSCE.2006.296291.

Jones, G.R., Intelligent Optical Fibre Based Systems for Monitoring the Condition of Power Equipment, Reliability of Transmission and Distribution Equipment, 1995, Second International Conference on the Mar. 29-31, 1955, pp. 73-78.

Pu-Jien Cheng, Querying Video Contents by Motion Example, Database Applications in Non-Traditional Environments, 1999 (Dante '99) Proceedings, 1999 International Symposium, pp. 287-293, Digital Object Identifier 10.1109/DANTE. 1999.844972.

Gardner, R.M. et al., FNET: A Quickly Deployable and Economic System to Monitor the Electric Grid, Technologies for Homeland Security, 2007 IEEE Conference on; May 16-17, 2007, pp. 209-214; Digital Object Identifier 10.1109/THS.2007.370047.

* cited by examiner

LOCATION DETERMINATION OF POWER SYSTEM DISTURBANCES BASED ON FREQUENCY RESPONSES OF THE SYSTEM

CROSS-REFERENCE TO RELATED APPLICATIONS

This application is a Divisional of U.S. patent application Ser. No. 11/588,247 filed Oct. 27, 2006 now U.S. Pat. No. 7,519,454, which claims benefit of U.S. Provisional Patent Application No. 60/749,105, filed on Dec. 12, 2005. The full disclosure of that provisional application is incorporated herein by reference.

STATEMENT OF GOVERNMENT INTEREST

The present invention was developed under National Science Foundation Agreement Number ECS-0215731. The government has certain rights in the invention.

FIELD OF THE INVENTION

The present invention relates generally to electric power systems and analyses thereof. More particularly, the present invention relates to a system that can locate where disturbances in the power system occur and methods thereof.

BACKGROUND OF INVENTION

In industrialized settings, power supplied to users is provided through a "power grid." Such a grid often consists of power plants, transmission substations, high voltage transmission lines, power substations, transformers and couplings to the end users. A power grid is also a collection of power networks, where power is shared so that power needs in one area can be compensated for from power from another area. Redundant paths and lines are provided so that power can be routed from any power plant to any load center, through a variety of routes, based on the economics of the transmission path and the cost of power. Much analysis is done by transmission companies to determine the maximum reliable capacity of each line, which, due to system stability considerations, may be less than the physical or thermal limit of the line. Analysis of a power grid system is important to its continued use and the detection of power system disturbances, such as generator trips.

Frequency information can be used in many areas of power system analysis, operation, and control. Typically, only static frequency measurements are widely available. This is because most frequency measurement devices assume a single system frequency, and they use long periods of data averaging in order to achieve good estimation accuracy. This is not a problem when the system is in its steady state. However, the most valuable frequency data are those obtained during disturbances, when the system frequency is time varying, and when frequencies could be very different in different parts of the system. Accurate dynamic wide-area measured frequency is highly desirable, especially as blackout events are becoming increasingly severe in power systems around the world.

Power engineers have worked for decades to develop measurement tools for observing a power system's dynamics. For example, in the early 1990's the synchronized Phasor Measurement Unit (PMU) was developed and later commercialized. Since then, a number of applications have been proposed that require wide-area measurement systems.

The results of all earlier efforts clearly point to the need for much wider measurement coverage, coverage that can be quickly and economically obtained. One issue that constrains industry monitoring occurs because of power deregulation and restrictions on use of some power systems data. Energy trading companies and financial services corporations would likely benefit from great abilities to analyze the power grid.

SUMMARY OF THE INVENTION

The present invention is also directed to a system for detecting and locating a disturbance event within a power grid. The system includes a series of frequency disturbance recorders (FDRs) in communication with the power grid at dispersed points of the power grid, an information management system, configured to receive data from the series of FDRs and analyze the received data and a communications network interconnecting the series of FDRs and the information management system. The information management system is configured to examine orders and patterns of receipt of frequency changes at the FDRs in the data caused by the disturbance event and to triangulate a location of the disturbance event based on the orders and patterns of receipt of the frequency changes or times of arrival.

In addition, the information management system may be configured to detect disturbance events including transmission line trips, generator trips and load rejections. The series of FDRs may be at least three FDRs. All FDRs may be synched to remaining FDRs through communication with Global Positioning System satellites or Internet time. Also, each FDR of the series of FDRs may be configured to send data packets with time stamps to the information management system through the communications network.

Also, the information management system may be configured to apply a least squares analysis to the data or to apply Newton's method for solving non-linear equations to the data or to apply a gradient search to the data to minimize distances between a probable event location and the series of FDRs to determine the location of the disturbance event. The data of the orders and patterns of receipt of frequency changes at the FDRs may be compared with other data received from past events to determine the location of the disturbance event, where that comparison may be facilitated the use of a decision tree. Propagation delays from a possible event to the series of FDRs may be computed and compared with the data of the orders and patterns of receipt of frequency changes and a Parzen window approach may be applied to the orders and patterns of receipt of frequency changes at the FDRs to determine the location of the disturbance event.

The present invention is also directed to a method for detecting and locating a disturbance event within a power grid. The method includes the steps of receiving frequency changes, caused by the disturbance event, at a series of frequency disturbance recorders (FDRs) in communication with the power grid at dispersed points of the power grid, transferring data based on the frequency changes to an information management system from the series of FDRs through a communications network interconnecting the series of FDRs and the information management system, analyzing the received data by the information management system by examining orders and patterns of receipt of the frequency changes at the FDRs and triangulating a location of the disturbance event based on the orders and patterns of receipt of the frequency changes.

The present invention is also directed to a method of detecting and locating events in a collective, where changes, caused by the event, are received at a series of recorders in communication with the collective at dispersed points of the collective, data based on the changes are transferred to an information management system from the series of recorders through a communications network interconnecting the series of recorders and the information management system, the received data is analyzed by the information management system by examining orders and patterns of receipt of the changes at the recorders and a location of the event is triangulated based on the orders and patterns of receipt of the changes by the recorders.

BRIEF DESCRIPTION OF THE DRAWINGS

The above and other aims, objectives, aspects, features and advantages of the invention will be better understood from a consideration of the following detailed description of the best mode contemplated for practicing the invention, taken with reference to certain preferred embodiments and methods, and the accompanying drawings in which.

DETAILED DESCRIPTION OF THE INVENTION

Figure 1:
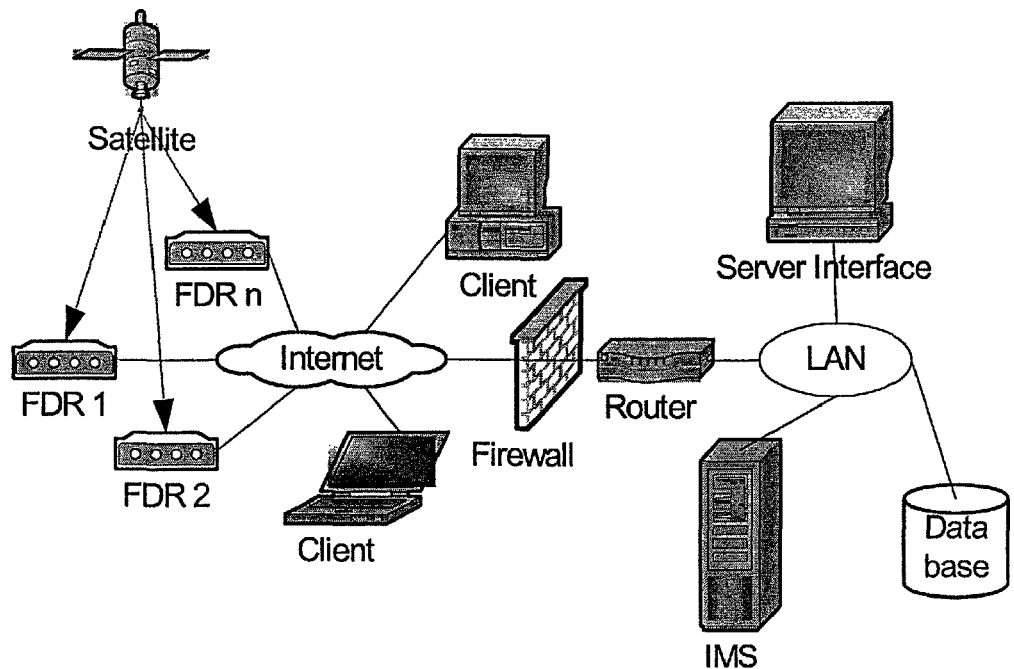
FIG. 1 is a schematic illustrating components in a frequency monitoring network system architecture, according to one embodiment of the present application.

In describing a preferred embodiment of the invention illustrated in the drawings, certain specific terminology will be used for the sake of clarity. However, the invention is not intended to be limited to that specific terminology, and it is to be understood that the terminology includes all technical equivalents that operate in a similar manner to accomplish the same or similar result.

The objective of the FNET (frequency monitoring network) effort is to create an extremely low cost and quickly deployable wide-area frequency measurement system with high dynamic accuracy, and that requires a minimal installation cost. All these features are possible in FNET due to the fact that the power system frequency can be accurately measured and GPS synchronized at 110V distribution voltage level of a typical office outlet.

When a significant disturbance occurs in a power system, the frequency varies in time and space. The FNET system is used to monitor the changing frequency in continuous time and in different locations. Dynamic measurement accuracy is critical. The frequency estimation algorithms developed for FNET have virtually zero algorithm error in the 52-70 Hz range. During the past three years, the first generation of the FNET system was completed. The FNET system was implemented and uses collected data to demonstrate how to use FNET to monitor and analyze the power system disturbance.

Frequency Monitoring Network Architecture

The FNET system is a wide-area sensor network consisting of highly accurate frequency disturbance recorders and a central processing server. FIG. 1 shows the framework of the FNET system. The FNET system consists of two major components: a) Frequency Disturbance Recorders (FDRs), which perform local GPS synchronized frequency measurements and send data to a server through the Internet; b) The Information Management System (IMS), which includes data collection and storage service, data communication service, database operation service, and web service. The Internet provides the wide-area communication network between the FDR units and IMS.

Figure 2A:
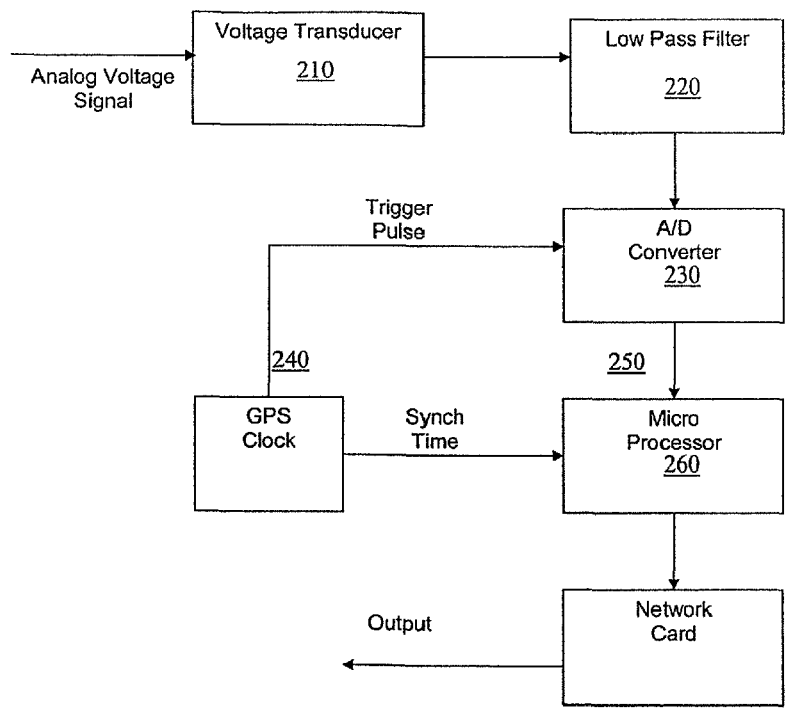
FIG. 2 illustrates a Frequency Disturbance Recorder (FDR), with FIG. 2(a) illustrating a schematic of the recorder and FIG. 2(b) illustrating a photo of an FDR, according to one embodiment of the present application.
Figure 2B:
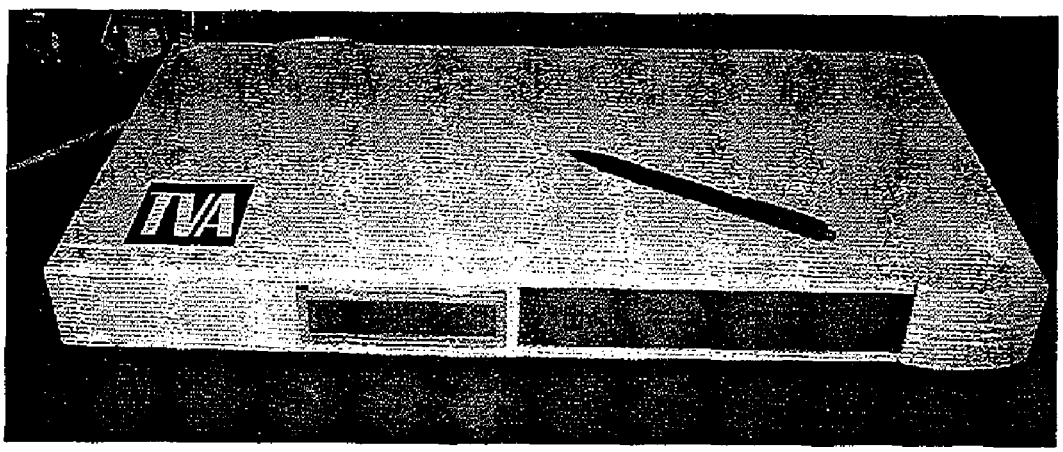

A FDR unit consists of a voltage transducer, a low pass filter, an analog to digital (A/D) converter, a GPS receiver, a microprocessor, and the network communication modules as shown in FIG. 2(a). The voltage transducer takes an analog voltage signal from an 110V wall outlet and converts it to acceptable A/D levels, the low pass filter eliminates the high frequency components, and the A/D converter transforms the analog signal into digital data. A microprocessor is used to generate the sampling pulses synchronized to the 1 pps from the GPS receiver integrated into the FDR. The phase angle, frequency, and rate of change of frequency were computed, using phasor techniques developed specifically for single phase measurements. The computed values are time stamped, and transferred to the IMS via the Internet. FIG. 2(b) shows an FDR unit.

Static frequency computations are usually done on voltage waveforms due to their relatively unchanging nature during normal operating conditions. The FDR unit makes frequency calculations using algorithms of phasor analysis and signal re-sampling techniques. The current version of FDRs has a sampling rate of 1440 Hz and the resulting frequency accuracy is ±0.0005 Hz or better.

A comparison was made in between one FDR and four commercial PMUs from four different manufacturers. The test used the PMUs and one FDR to measure the frequency of the same phase voltage signal from a wall outlet. The frequency data from all of the units were compared. Given that true system frequency should not change suddenly under any circumstances, it is clear that the accuracy of the FDR is more refined compared to the commercial PMUs.

Figure 5:
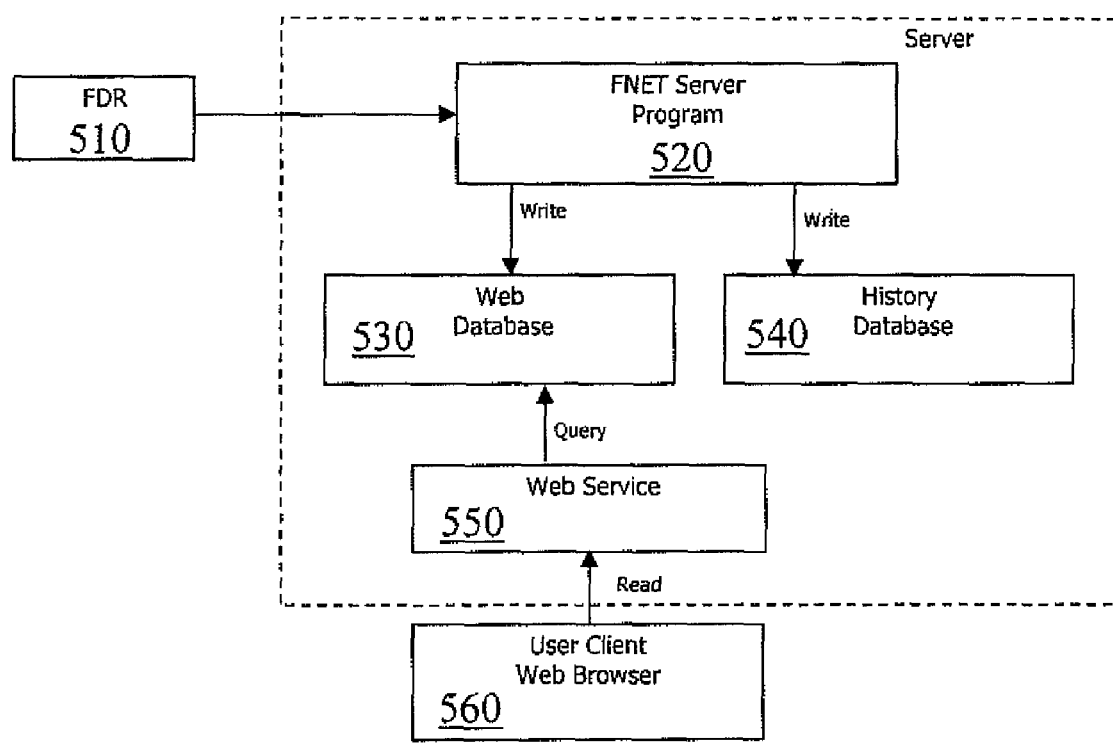
FIG. 5 is a schematic illustrating a multi-tier information management system structure, according to at least one embodiment of the present application.

The IMS is a vital component in the FNET system. It is based on a multi-tier client/server architecture. FIG. 5 describes the configuration of the main services and functions of the IMS server. The real-time frequency data is transmitted to the IMS server through the Internet. After receiving the data from the FDR units, the IMS server processes, time aligns, and saves it in a database and provides data for the web service to display the information online.

Multi-tier client/server architecture facilitates software development because each tier is built and run on a separate platform, thus, making it easier to organize the implementation. In addition, multi-tier architectures readily allow different tiers to be developed in different languages, such as C++ for the application tier, SQL for the database tier, and Java for the web tier. The IMS server controls data communication and database operation transactions and asynchronous queuing to ensure reliable completion of all the transactions. It also provides access to resources based on names instead of locations and, thereby, improves scalability and flexibility as system components are added or moved.

The web server provides a link to the available services to the end users via the Internet. The web server caches the Java applets, Java Internet security applets and dynamic web pages for downloading as portable programs by the user for execution. It also supports a search engine function for users to visit the historical frequency data in the database server. The users do not need to query databases, execute complex business rules, or connect to legacy applications. The web service tier will do these jobs for users transparently.

Although the current Internet is believed to lack reliability and latency guarantee to support real-time communication, many of the applications intended by FNET are not time-critical (e.g. observation, model validation, post-mortem analysis). The current network performance has proven to be very satisfactory for FNET. Low rate of missing data was experienced only from some units. Several FDRs have been in operation for more then one year. FDR redundancy can more than compensate for data transfer reliability. Furthermore, network providers are moving towards several crucial milestones in network evolution. It is expected the next generation of Internet should meet most of the realtime communication requirements.

FNET Implementation

The first phase of the FNET system was built with 30 FDR units deployed throughout the continental United States, and an IMS at Virginia Tech. In the near future, there will be approximately 50 FDR units in the FNET system. The FDR units continuously send the measured frequency data of the local power network to the server at a rate of 10 packets per second with each pocket synchronized to the nearest microsecond. The algorithm has the flexibility to produce 1440 outputs per second, if necessary.

The FDR units are designed to record dynamic frequency information for power system analysis (and control in the future). The placement of FDR units is an important issue for the FNET system. Their location should be selected to effectively reflect the different frequency clusters of inter-area oscillations and to cover as broad an area as possible, in order to capture dynamic behavior of larger system disturbance. Just like PMU placement, FDR locations should represent the system frequency, effectively describe the behavior of major inter-connected systems, and provide information on the large area load behavior. The present placement of FDRs is aimed to cover all the regional reliability regions that form North American Electric Reliability Council (NERC). In the future FNET system, more FDR units will be located close to major generation centers, major transmission tie lines and load concentrated areas for local frequency oscillation mode study. Thanks to their minimal installation cost and plug and play operation, FDR units can be easily relocated, if necessary.

The IMS is made up of three main components: the application server program, the database operation service, and the web service. The FNET server program is used to communicate with the FDR units, receive the frequency data, write the real-time frequency data to a historical database and web database, and display the data in the server machine for monitoring and comparing. The server communicates with the remote FDR units via TCP/IP and socket communication. An interface displays the FDR location information and its communication status. It also shows the real time frequency data waveform in the server interface. The server program is written in the C++ language.

The backend database is dedicated to data and file services that can be optimized without using any proprietary database languages. In the FNET system, ODBC is used for database manipulation. The web service integrates the frequency display and the monitoring and historical data retrieval functions into a common easily accessible user interface, to observe the frequency information from anywhere on the Internet. The functionality of the interface is only limited to viewing the average frequency information of the system being monitored. The server pages are written in PHP and Java.

Figure 6:
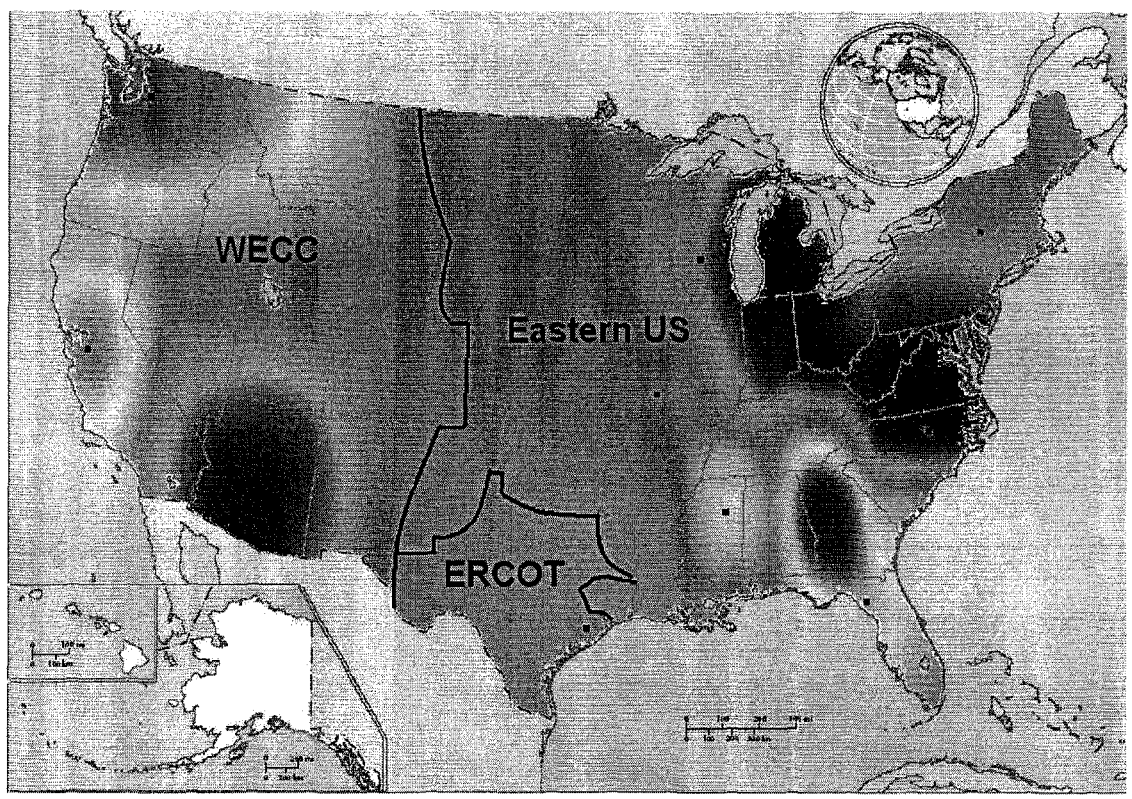
FIG. 6 is a map providing visualization of frequency dynamic data, according to embodiments of the present application.

At the same time, the web service provides a frequency plot window for each FDR unit. A frequency distribution map (see FIG. 6) provides a visualization of the dynamic frequency information in a geographic context within each interconnection (WECC, Eastern, and ERCOT).

The server receives data from different FDR units, processes the data, manages the database, performs data analysis, and supports the web service for the Internet users. The frequency IMS server can be physically located anywhere, which is with the following system configurations: a) Hardware configuration: A dual CPU (Intel Pentium 4 CPU 3.6 GHz) server with a hard disk (500 GB) is employed to meet the need of reliable data transmission, processing and web service. The backup data is stored both on the hard disk of the server and in an external hard drive. b) Server software configuration: Windows XP 2003 Server is the host operating system. A commercial database is installed at the database server machine, as the backend database. C++ is employed for the whole server program design and communication. Internet standard web browsers are used as the interface for the user to access the frequency data.

FNET Application and Observation Analysis

The FNET system can be used in many power system applications, including verifying system models and parameters used in simulations, performing post-disturbance scenario reconstruction and tracking the sequence of events leading to an emergency, understanding the fundamental characteristics and mathematics of failure of complex systems, and provide wide-area information for improving power system control functions. The system can also provide near real-time system status for analyzing the underlying causes of cascading events and system blackouts, allow for study of how frequency disturbances travel as electromechanical waves in power systems, "frequency wave" travel characterizes analysis, develop algorithms to triangulate generator tripping location and predict trip amount in MW and an adaptive under-frequency load shedding algorithm using wide-area frequency as inputs.

FNET frequency can be used as inputs for FACTS/ESS control in inter-area low frequency oscillation damping, ACE accuracy improvement can be made with FNET data, inter-area oscillation modes calculation and prediction based FNET measurement data, wide area PSS control and coordination using FNET can be used as inputs, Distributed Generation (DG) control and coordination using regional FNET measurements can be performed, system model validation using FNET data and wide area frequency data visualization and graphic user interface (FNET data streamer, dynamic map display).

In the following sections some observations of the FNET frequency information are discussed, and an interesting application is given. All of the time references in the following sections are in UTC (Coordinated Universal Time).

Here is an example event in WECC which occurred on Jun. 14, 2004, and the FNET system recorded the frequency information of this event. The first tripping happened at 14:40:45 (UTC), and the second tripping happened 21 seconds later (14:41:06). It can be concluded that the power loss on the second tripping was much larger than the first one, and the slope of the initial swing of the second tripping was greater than the first. The frequency declined to about 59.57 Hz, and then gradually recovered to the normal operating state at 14:58:28. The gradual recovery may be due to the combinations of governor reactions and automatic generation control (AGC), which is the secondary frequency control in power plants.

Power engineers have long recognized the finite travel time of electromechanical propagation of disturbances. With frequency information from multiple FDR units in the system, the location of this event can be estimated by triangulation. Amount of generation change can be estimated by frequency drop.

On Aug. 4, 2004, a generator tripped and the frequency of the Eastern interconnection declined but the start time and the slope of the decline were different at different locations in the Eastern system, as recorded by the FNET. Before the event happened, the Eastern system frequency was 59.98 Hz, and the units in ARI, VT, UMR, and ABB first saw frequency drop at 14:23:19.8 (UTC); then units in MISS and UFL experienced frequency drop after 1 second; in the end, the frequency went down to 59.955 Hz at 14:23:23.8 (UTC).

From the delay time difference and the amount of frequency decline, the estimated event location can be determined. The estimation error is affected by the frequency wave speed difference in different locations and directions. The amount of tripped generation is proportional to the average rate of frequency drop and system inertia. In other words, for a given system, the initial rate of frequency change df/dt is proportional to the power imbalance, $\Delta p$. A simple relationship of power imbalance, $\Delta p$ with respect to measured frequency drop rate, can be derived based on the previously recorded frequency change and the corresponding known drop amount. In this case, the estimated tripped generation was 786 MW, while the actual tripped generation was around 870 MW.

Another event occurred on Sep. 19, 2004. The Eastern System experienced a sudden frequency decline, and the FNET system recorded the frequency information at each of the FDR units (Table 1). The frequency dropped to approximately 59.95 Hz at 8:56:13 (UTC). Using the same algorithm as in the first example, the estimated tripped generation was 1178 MW, while the real tripped generation was reported as 1180 MW.

These two examples demonstrated that the frequency information from the FNET system can be used to estimate the amount of power imbalance and the location of the tripped generator.

TABLE 1

| Unit | Drop Time (UTC) | Frequency Drop (Hz) |
|---|---|---|
| NY | 8:56:10.2 | 59.9861-59.9465 |
| UMR | 8:56:08.8 | 59.9854-59.9498 |
| ARI | 8:56:09.8 | 59.9862-59.9504 |
| VT | 8:56:09.1 | 59.9883-59.9502 |
| ABB | 8:56:09.7 | 59.9866-59.9461 |
| MISS | 8:56:09.4 | 59.9864-59.9514 |
| Calvin | 8:56:09.9 | 59.9874-59.9499 |

With their integrated GPS receivers, FDR units can simultaneously measure the local system frequency in different dispersed locations. FNET provides a common time stamp, which helps reconstruct major events. One major delay in determining the causes of the 2003 blackout was the use of different timing references by the companies involved. Initial analysis of some recorded data shows the potential of the FNET to pin-point the tripping generator and its tripped power. Using the triangulation techniques and empirical equations, tripping events in WECC and the Eastern US systems can be identified using time delay in frequency data from different units.

FNET provides valuable data for studies of inter-area oscillations, disturbance analysis, scenario reconstruction, and model verification. In the future, researchers hope to use the data from the FNET system to forecast incipient system breakups and recommend remedial actions. The continuous synchronized information from the FNET system will provide system operators with close to real-time system status for better grid management. With future high speed communication, the real-time wide-area frequency information can be used in many areas to perform control and protection functions. The FNET system provides power system researchers, operators, customers, and policy makers an Internet accessible, cost-effective, cross-platform frequency information monitoring network.

Mathematical Estimation of the Generator Trip Locations

This section looks at the mathematical estimation of the generator trip locations solely from frequency data observed by the ten relevant FDRs in the EUS. Concepts taken from both mathematics and seismology are used in an attempt to compose a solution that deals with the vastly dynamic and heterogeneous nature of the EUS. Methods suited for solving both linear and non-linear sets of equations are used for the purpose of event location. The prevention of catastrophic power system failures relies on the timely triangulation of events such as generator trips.

Although the current Internet is believed to lack the reliability and latency to support real-time communication, many of the applications intended by FNET are not time-critical. These applications include system observation, model validation, and post-mortem analysis. The current network performance has proven to be satisfactory for FNET and its applications. FDR redundancy can more than compensate for data transfer reliability. Furthermore, network providers are moving towards several crucial milestones in network evolution. It is expected that the next generation of the Internet should meet many of the real-time communication requirements.

Figure 3:
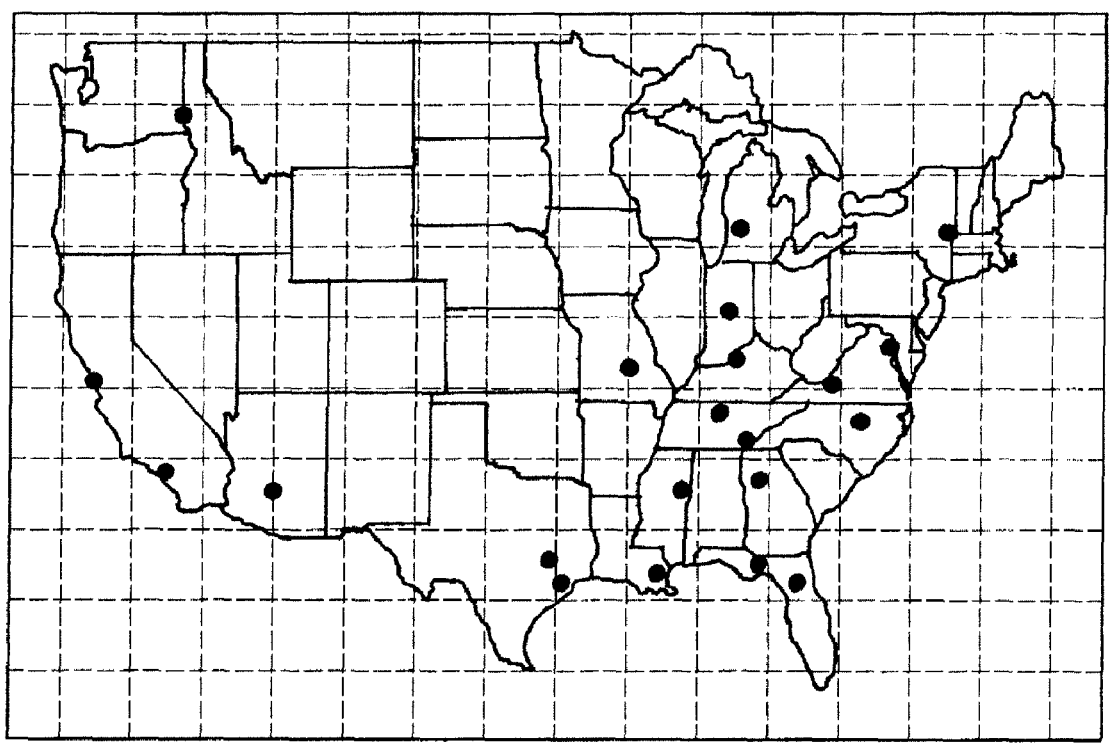
FIG. 3 is a map illustrating current FDR locations in the United States, according to one embodiment of the present application.

FIG. 3 shows the present location of each FDR that has been placed in each of the three interconnections in the United States. These interconnections are referred to as the Eastern United States Interconnection System (EUS), the Western Electric Coordinating Council (WECC), and the Electric Reliability Council of Texas (ERCOT).

Event Data and Relevant FDR Information

Figure 4:
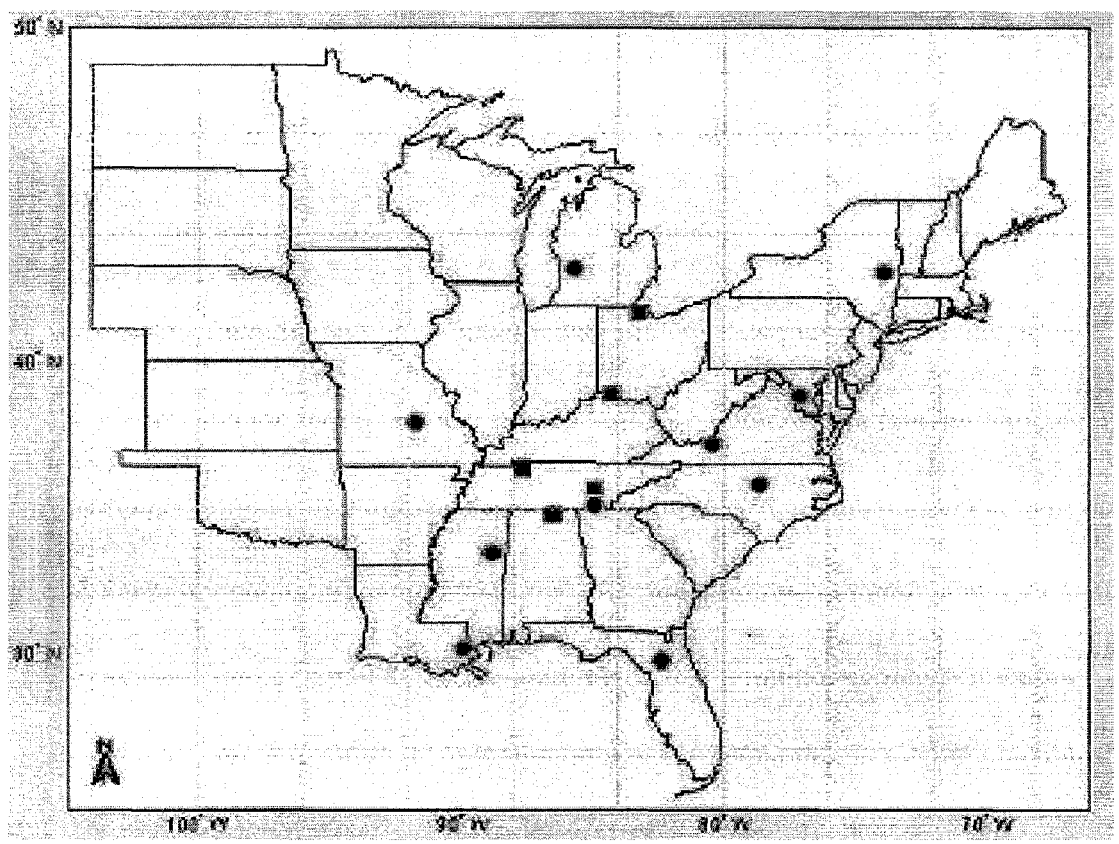
FIG. 4 is a map illustrating generator trip locations used to study power grid, according to one embodiment of the present application.

This section is not based upon constrained computer aided simulations. Rather, this section is based on calculations performed on data recorded by ten FDRs each of which are a part of FNET. The data provided for the five generator trip cases used in this section are presented in FIG. 4. It is relevant to again point out that this section focuses completely on the EUS. The FDRs in FIG. 4 are used in this section for the purpose of "triangulation" after a contingency. Table 2 lists information about each FDR used in this study. Although the location estimation effort is quite different from the familiar area of power system state estimation, there are a few common principles that are used in both. The number of units, unit location, and conditioning of unit data are important factors to both areas. As the development and furtherance of FNET is yet a growing science, the placement of FDRs throughout the EUS is still relatively sparse and spotted (although increasingly less so). Furthermore, there is also no control over the power system events that serve as the base cases for this study. Hence this first effort is made to serve as a foundation in the area of power system event location.

TABLE 2

| Unit Number | Unit Name | NERC Region | Latitude | Longitude |
|---|---|---|---|---|
| 1 | NY | NPCC | 42.8018 | −73.9281 |
| 2 | UMR | MAIN/SERC | 37.9487 | −91.7658 |
| 3 | ARI | SERC | 38.8210 | −77.0862 |
| 4 | VT | ECAR/SERC | 37.2327 | −80.4284 |
| 6 | ABB | SERC | 35.8220 | −78.6587 |
| 7 | MISS | SERC | 33.4567 | −88.8222 |
| 9 | UFL | FRCC | 29.6742 | −82.3363 |
| 11 | Calvin | ECAR | 42.9613 | −85.6557 |
| 17 | Tulane | SERC | 30.0658 | −89.9313 |
| 20 | TVA1 | SERC | 35.1313 | −84.8750 |

Each event was not observed by every FDR in the set of ten. Rather, each of nine events was measured only with a subset of the ten FDR units. These events that serve as base cases are important in the development of an event location algorithm because they give us insight about the behavior of the EUS in an event. Furthermore, for each base case there is confirmation on general location and approximate trip amount. These base cases do not provide, however, information on the exact tripping times of the generators in question. FIG. 4 shows the locations of the base cases that have been used for this study in relation to the FDR units. Base cases are plotted with squares and the FDRs are also plotted as blue dots. Table 3 lists pertinent information about the base cases used in this section.

TABLE 3

| Case Number | 1 | 2 | 3 | 4 | 5 |
|---|---|---|---|---|---|
| Date | Aug. 4, 2004 | Sep. 19, 2004 | Feb. 11, 2005 | Mar. 21, 2005 | Apr. 22, 2005 |
| Plant Name | Davis Besse | Watts Bar | Browns Ferry | Cumberland | Zimmer |
| Nearest Town | Oak Harbor | Spring City | Athens | Cumberland City | Moscow |
| State | Ohio | Tennessee | Alabama | Tennessee | Ohio |
| NERC Region | ECAR | SERC | SERC | SERC | ECAR |
| Latitude | 41.5116° | 35.6874° | 34.7860° | 36.3822° | 38.8603° |
| Longitude | −83.1467° | −84.8641° | −86.9599° | −87.6440° | −84.2285° |
| FDR Set | {2, 3, 4, 6, 7, 9} | {1, 2, 3, 4, 6, 7} | {2, 3, 4, 6, 7, 9, 11} | {2, 3, 4, 6, 7, 9, 11, 17, 20} | {2, 3, 4, 6, 7, 9, 11, 20} |

Figure 7:
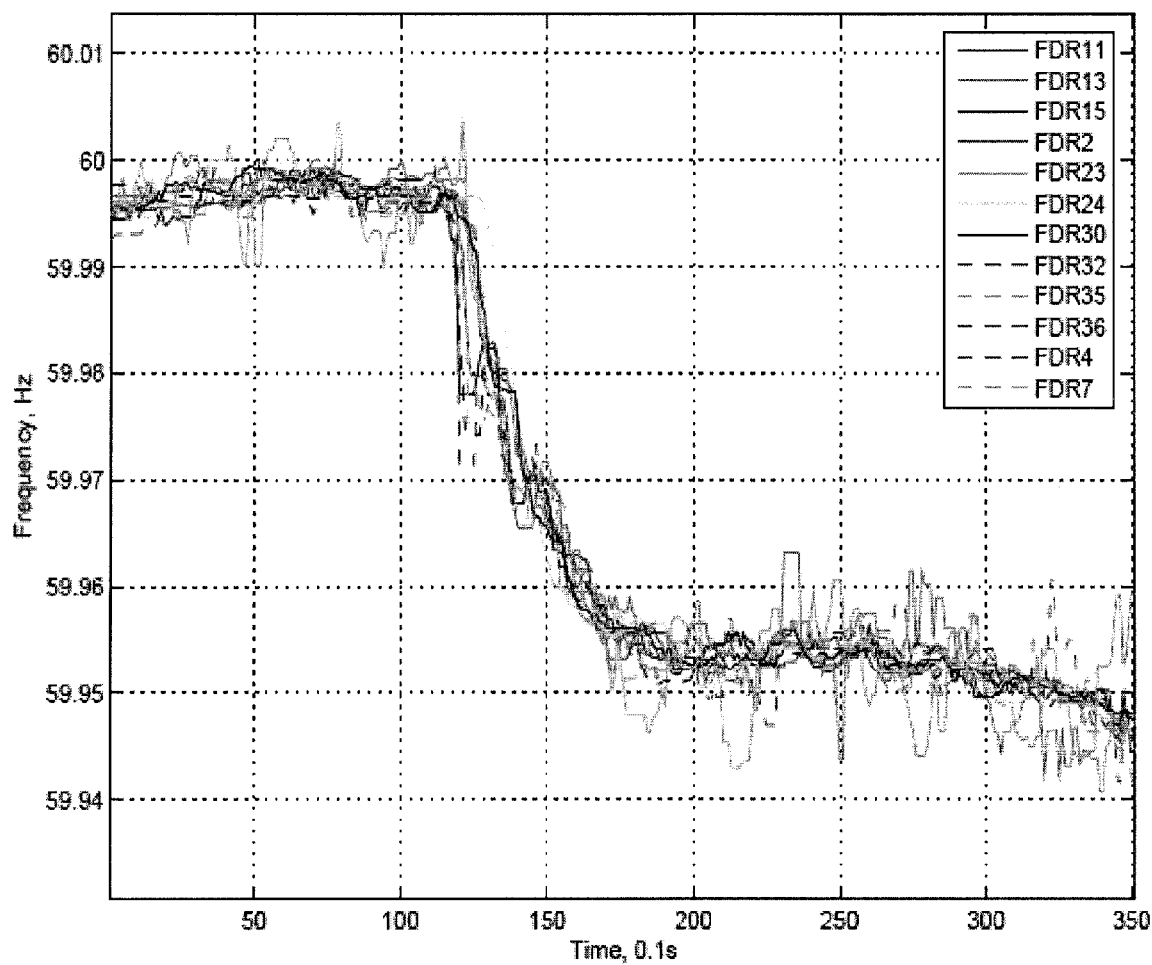
FIG. 7 is a graph illustrating a typical frequency signature of a generator trip, according to one embodiment of the present application.

Frequency perturbations travel throughout the EUS and in any power system in general with finite speed. In the EUS, frequency perturbations tend to travel with velocity on the order of 500 mi/s and in the WECC, frequency perturbations have been observed to travel with velocity on the order of 1000 mi/s. The event location algorithms herein capitalize on the fact that frequency perturbations after events like generation trips will be measured by each FDR at different times. This time delay of arrival then gives a parameter by which to order the response of each unit. FIG. 7 shows the frequency signature of a typical generation tripping event. It should be noted that there is a very discernible delay in the frequency drop as measured by several FDRs. Indeed it is discernable that one frequency plotted drops first at time, $t_1$, and a later frequency plotted drops last at time, $t_{end}$. This frequency drop is expected as the result of a generation/load mismatch in the few seconds following a significant loss of generation. Therefore, the input parameters for the following event location algorithms are the times: $t_1; t_2; :::; t_n$ corresponding to the times at which $FDR_1; FDR_2; :::; FDR_n$ measured the frequency disturbance.

It is also important to note that all of the location algorithms solve for the hypocentral location (the location at which the disturbance is suspected to originate) in terms of coordinates, $(x_h; y_h)$. The Greenwich coordinates of each unit $(Lat_n; Lon_n)$ are mapped to coordinates $(x_n; y_n)$ before performing the locational analysis and reverse the mapping after the analysis.

The Least-Squares Event Location Approach

From basic physics, the key concept in least-squares event location can be obtained. Below a basic equation that relates mean velocity, time of travel, and distance traveled:

$$\text{Distance} = \text{Velocity} \times \text{Time} \quad (1)$$

Applying this concept to electromechanical waves with the assumption that such waves travel throughout the electric grid as a continuum, (1) can be developed using the Pythagorean relation written in terms of the data as:

$$(x_i - x_h)^2 + (y_i - y_h)^2 = V^2(t_1 - t_h)^2 \quad (2)$$

For each responding FDR, it can be written:

$$(x_1 - x_h)^2 + (y_1 - y_h)^2 = V^2(t_1 - t_h)^2$$
$$(x_2 - x_h)^2 + (y_2 - y_h)^2 = V^2(t_2 - t_h)^2$$
$$\vdots$$
$$(x_n - x_h)^2 + (y_n - y_h)^2 = V^2(t_n - t_h)^2$$

where $(x_n; y_n)$ are the (x; y) coordinates of the $n^{th}$ FDR to respond; $(x_h; y_h)$ are the (x; y) coordinates of the hypocenter (origin of disturbance); $t_n$ is the time at which the $n^{th}$ FDR measures the electromechanical wave; $t_h$ is the time at which the event occurred; and V is the mean velocity at which the frequency perturbation travels. The unknowns in the above equation set are: the hypocentral coordinates, $(x_h; y_h)$, and the time at which the event occurred, $t_h$. A set of mean velocities, $\{V_1; V_2; :::; V_k\}$, are assumed rendering a set of hypocentral coordinates, $\{(x_{h1}; y_{h1}) (x_{h2}; y_{h2}); :::; (x_{hk}; y_{hk})\}$, in the solution of the system.

To find a set of solutions, we seek a linear system in terms of the hypocentral coordinates such that the least-squares (LS) method of solving an over-constrained system of equations can be used. In general, the system of equations will be over-constrained since many more FDRs typically respond than there are variables. By subtracting successive pairs of equations, a linear equation in terms of the hypocentral coordinates is produced:

$$(x_{i+1} - x_i)x_h + (y_{i+1} - y_i)y_h - V^2(t_{i+1} - t_i)t_h = C_i \quad (3)$$

Where Ci is defined as:

$$C_i = \frac{1}{2}[V^2(t_{i+1} - t_i) + x_{i+1}^2 + y_{i+1}^2 - x_i - y_i] \quad (4)$$

Hence, (3) can be written for every unit that responds forming a system of equations that can be placed in a matrix to form:

$$C = Hx \quad (5)$$

with matrix variables defined as:

$$C = \begin{bmatrix} C_1 \\ C_2 \\ \vdots \\ C_n \end{bmatrix} \quad x = \begin{bmatrix} x_h \\ y_h \\ z_h \end{bmatrix} \quad H = \begin{bmatrix} x_2 - x_1 & y_2 - y_1 & V^2(t_2 - t_1) \\ x_3 - x_2 & y_3 - y_2 & V^2(t_3 - t_2) \\ \vdots & \vdots & \vdots \\ x_n - x_{n-1} & y_n - y_{n-1} & V^2(t_n - t_{n-1}) \\ x_1 - x_n & y_1 - y_n & V^2(t_1 - t_n) \end{bmatrix}$$

To solve for x in (5), which is constructed to contain the hypocentral coordinates, we use the pseudo-inverse defined as:

$$H^\dagger = (H^T H)^{-1} H^T \quad (6)$$

which yields the final LS solution as:

$$x = H^\dagger C \quad (7)$$

Figure 8:
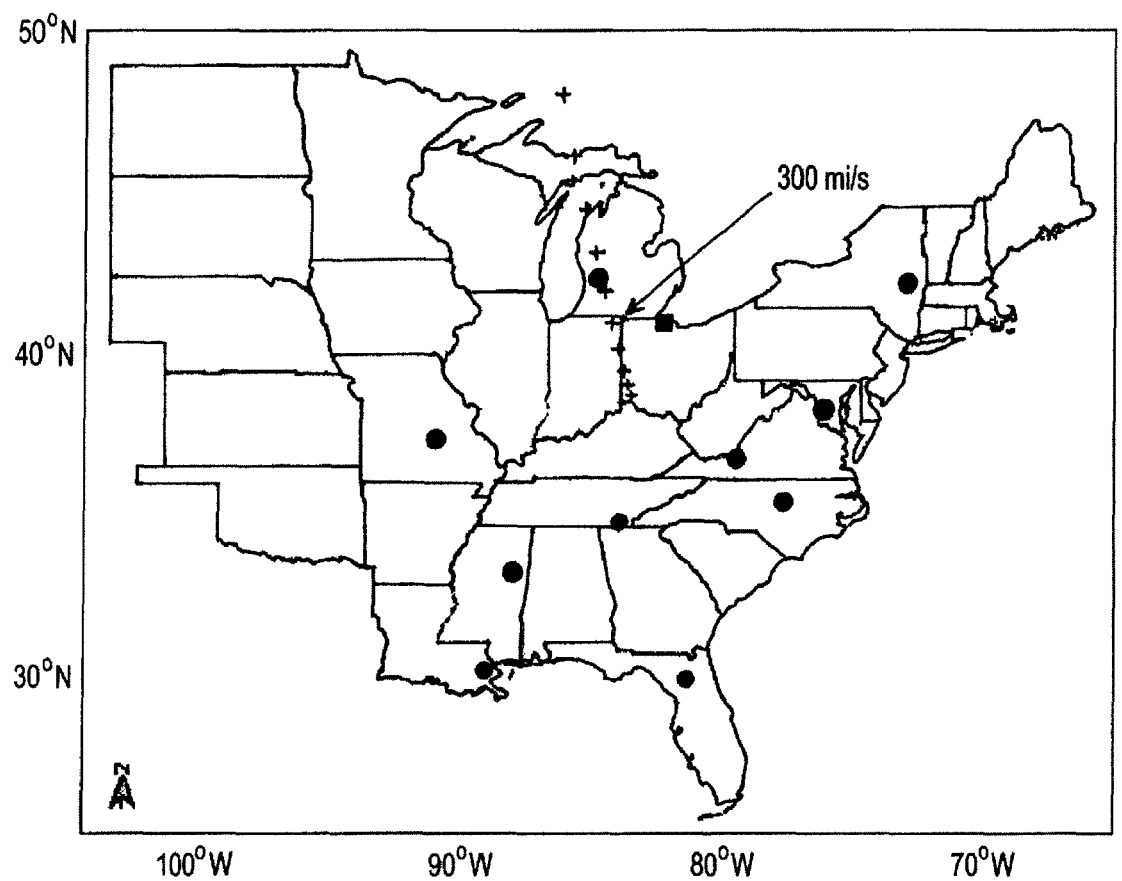
FIG. 8 is a map providing an LS event location estimate for one case, according to one embodiment of the present application.
Figure 9:
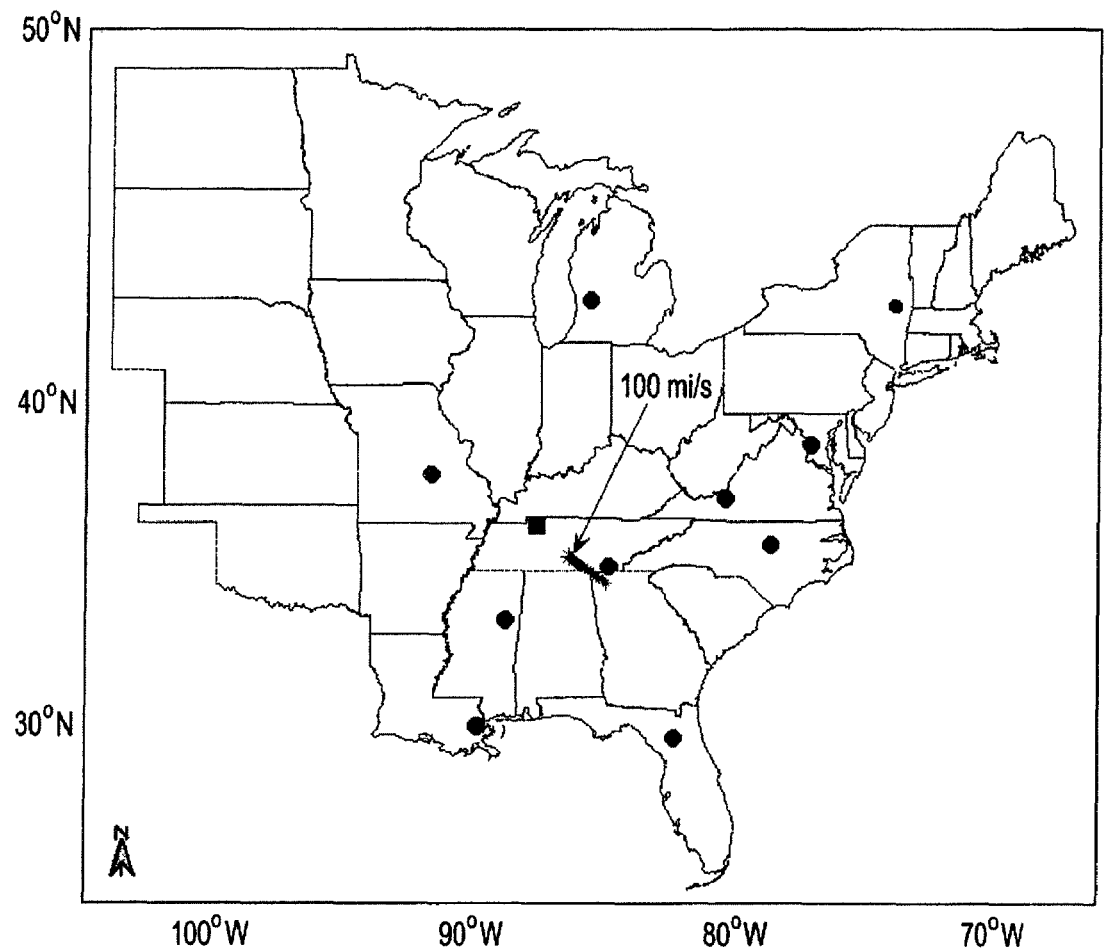
FIG. 9 is a map providing an LS event location estimate for another case, according to one embodiment of the present application.
Figure 10:
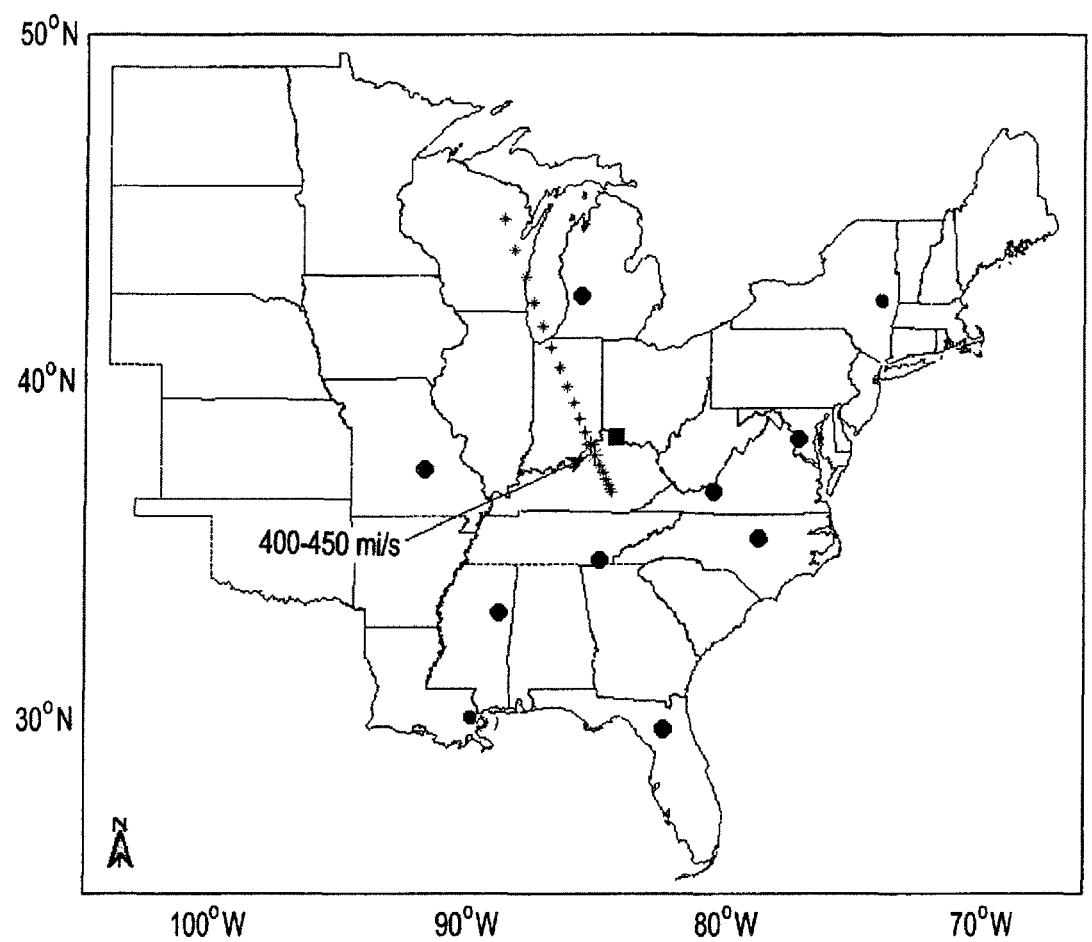
FIG. 10 is a map providing an LS event location estimate for another case, according to one embodiment of the present application.

A disadvantage of using the LS method to find the hypocentral coordinates is that one must assume that the electromechanical waves are traveling in a continuum at a constant velocity in each direction. Therefore, the velocity set, $\{V_1; V_2; :::; V_k\}$, must be assumed before solving. To date, there is no accepted velocity model for the travel of electromechanical waves in the EUS. FIGS. 8, 9, and 10 show the results of the LS method, plotted with asterisks, using velocities, $Vj \in \{V_1, V_2, \ldots, V_k\}$, that vary from 100 mi/s to 1000 mi/s. This range for $V_j$ was chosen based upon past observations of disturbances traveling between 350 mi/s and 660 mi/s in the EUS. In FIGS. 8, 9, and 10, the closest solution location is enlarged and pointed out with an arrow. The base case location (true value) being estimated is plotted with a square and the FDR locations are shown using blue dots.

The Newtonian Event Location Approach

This section begins with a re-examination of the Pythagorean relation with inputs governed by (2). As opposed to seeking a linear LS solution, Newton's method for solving non-linear equations is explored. Begin by re-writing (2) as:

$$f(x) = y \tag{8}$$

where:

$$f(x) = \begin{bmatrix} f_1(x) \\ f_2(x) \\ \vdots \\ f_n(x) \end{bmatrix} \quad x = \begin{bmatrix} x_h \\ y_h \\ t_h \end{bmatrix} \quad y = \begin{bmatrix} V^2 t_1^2 \\ V^2 t_2^2 \\ \vdots \\ V^2 t_n^2 \end{bmatrix}$$

such that (2) can be re-written as:

$$(x_i - x_h)^2 + (y_i - y_h)^2 - V^2(2 t_i t_h - t_h^2)^2 = V^2 t_i$$

Placing (8) in the form of:

$$f(x) - y = 0 \tag{9}$$

then solve for the unknown hypocentral coordinates using Newton's method with the initial guess:

$$x_0 = \begin{bmatrix} x_0 \\ y_0 \\ t_0 \end{bmatrix} = \begin{bmatrix} \frac{1}{k} \sum_{i=1}^{k} x_i \\ \frac{1}{k} \sum_{i=1}^{k} y_i \\ \min(t_i) \end{bmatrix} \tag{10}$$

Newton's method is used to solve (9) as constructed with initial guesses (10) multiple times corresponding to each $Vj \in \{V_1, V_2, \ldots, V_k\}$. It is important to note that the variable nomenclature in this section corresponds exactly to that of the previous section.

Figure 12:
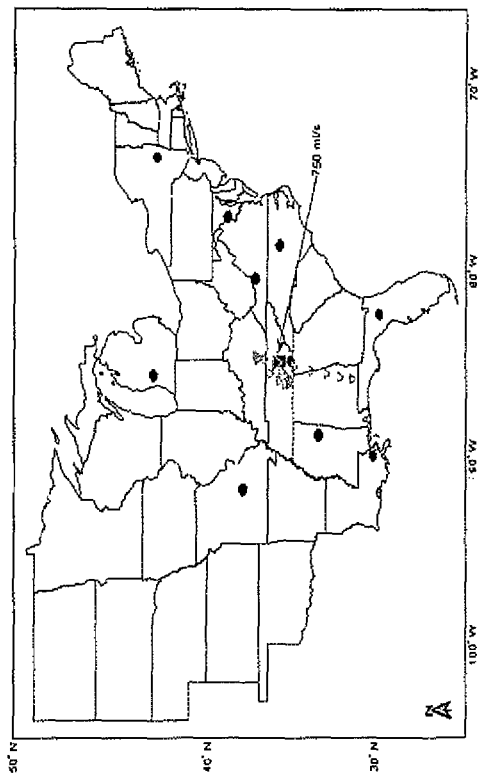
FIG. 12 is a map providing a Newtonian event location estimate for another case, according to one embodiment of the present application.
Figure 11:
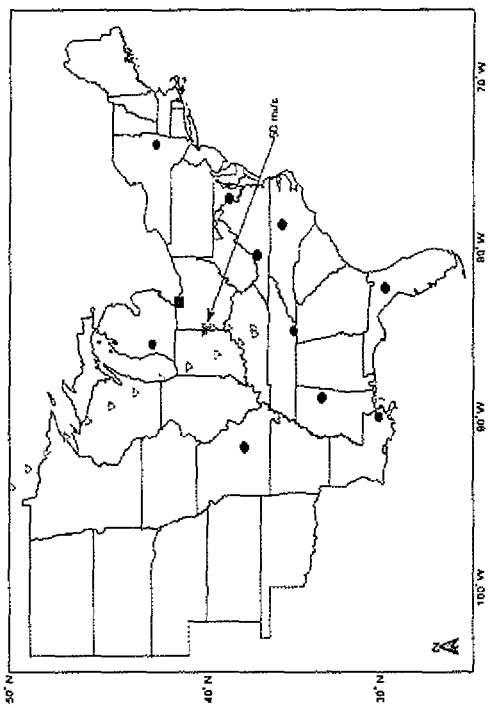
FIG. 11 is a map providing a Newtonian event location estimate for one case, according to one embodiment of the present application.
Figure 13:
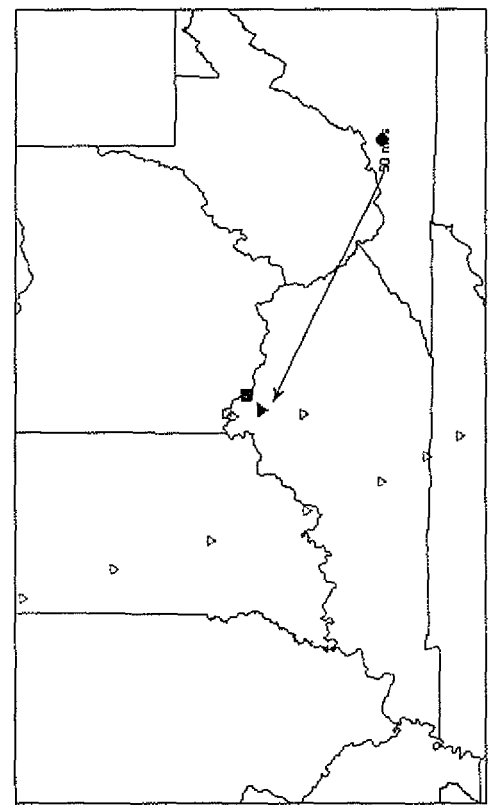
FIG. 13 is a map providing a Newtonian event location estimate for another case, according to one embodiment of the present application.

FIGS. 11, 12, and 13 show the hypocentral solution set using Newton's nonlinear solution method where each element of the solution set is plotted with a triangle. The closest solution location is enlarged and pointed out with an arrow. Again, the base case being triangulated is plotted with a square and the FDR locations are shown using blue dots.

The Gradient Search Event Location Approach

In the previous two Sections, a factor limiting the accuracy of the hypocentral coordinate solutions was the need to select a mean continuum velocity, $Vj \in \{V_1, V_2, \ldots, V_k\}$. How does one select an optimal $Vj$ such that the rendered solution is closest to the actual location? This method, therefore, does not require any assessment or approximation of the velocity, $Vj$, of the electromechanical wave front. The consequence, however, is that the event occurrence time is not calculated. The method used here is based upon minimizing the distance between the purported event location and each FDR, ri. This method, however, would lead to the same hypocentral solution for each case where the observation set of FDRs is the same. Therefore, a constraint is applied to the minimization process as follows:

$$r_1 \leq r_2 \leq \ldots \leq r_n \tag{11}$$

where $r_i$ is associated with the $i^{th}$ FDR unit and all FDRs are numbered in ascending order according to disturbance detection time. The following is the objective function that is to be minimized:

$$\phi(x_h, y_h) = \sum_{i=1}^{n} r_i^2 \tag{12}$$

where $r_i$ is defined as:

$$r_i = \sqrt{(x_i - x_h)^2 + (y_i - y_h)^2} \tag{13}$$

Again, the variable conventions used in this section are consistent those used in the previous two sections. The objective function can be minimized via finding the steepest descent using a gradient search method. The basics of the gradient search method used in this paper can be seen in the following steps. First the gradient of the objective function is calculated:

$$\nabla \phi(x_h, y_h) = \begin{bmatrix} \frac{\partial \phi}{\partial x_h} \\ \frac{\partial \phi}{\partial y_h} \end{bmatrix} \tag{14}$$

The gradient is negated to find the steepest descent, multiplied by an appropriately chosen scalar, $\alpha$, and then added to the initial guess to find an updated guess as follows:

$$\begin{bmatrix} x_h(i+1) \\ y_h(i+1) \end{bmatrix} = \begin{bmatrix} x_h(i) \\ y_h(i) \end{bmatrix} - \alpha \begin{bmatrix} \frac{\partial \phi}{\partial x_h} \\ \frac{\partial \phi}{\partial y_h} \end{bmatrix} \tag{15}$$

Figure 14:
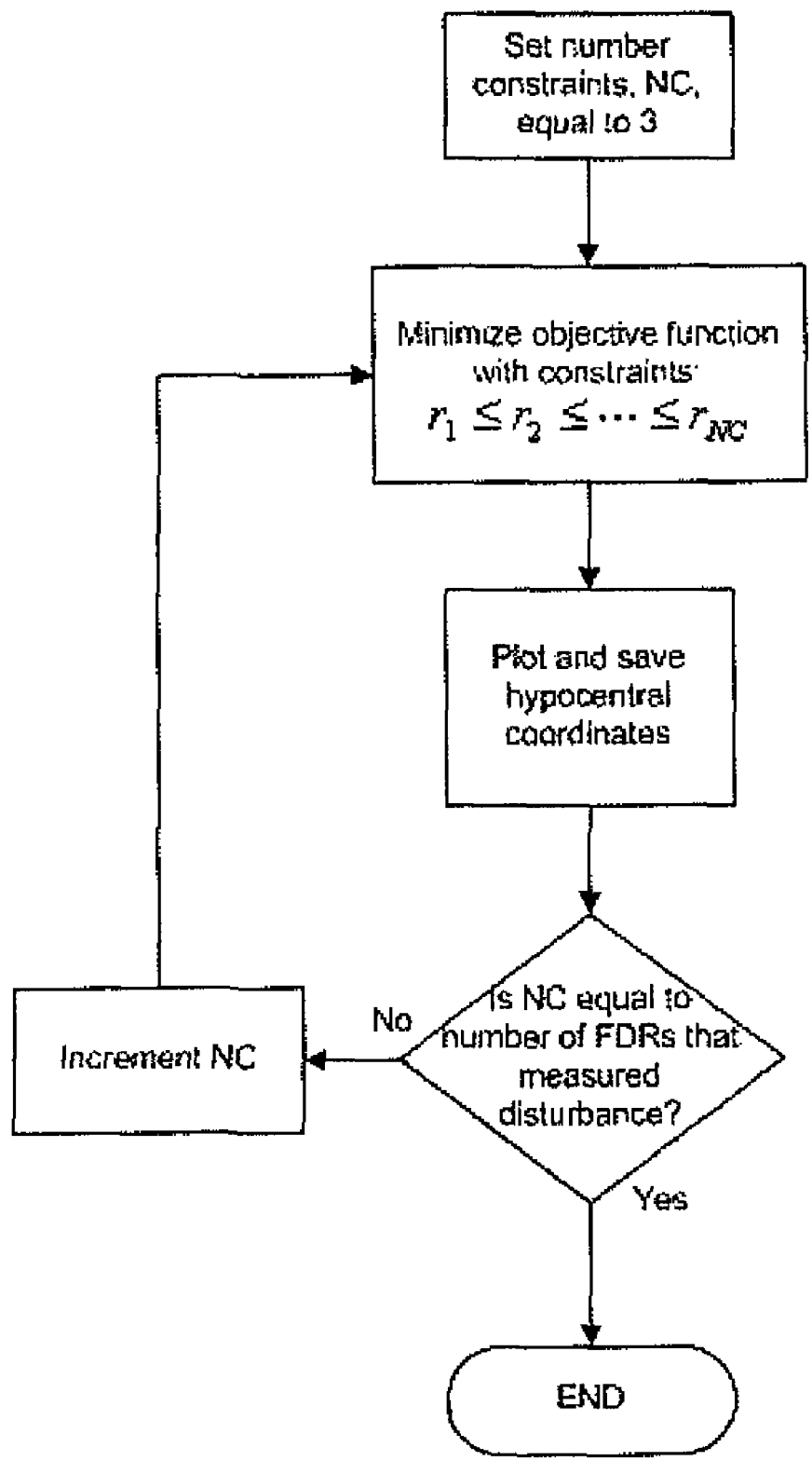
FIG. 14 is a flowchart illustrating a method of gradient search event location, according to one embodiment of the present application.

The process is iterated until convergence is found. A disadvantage of this method, however, is that it is very sensitive to the order in which the FDRs measured the disturbance. Hence, the process is repeated several times depending on how many FDRs measured the disturbance. If n FDRs measured the disturbance, then the process is repeated n–2 times with the distance constraints in (11) added incrementally beginning with three constraints determined according to which FDRs first measured the disturbance. The flowchart in FIG. 14 illustrates this process further.

Figure 15:
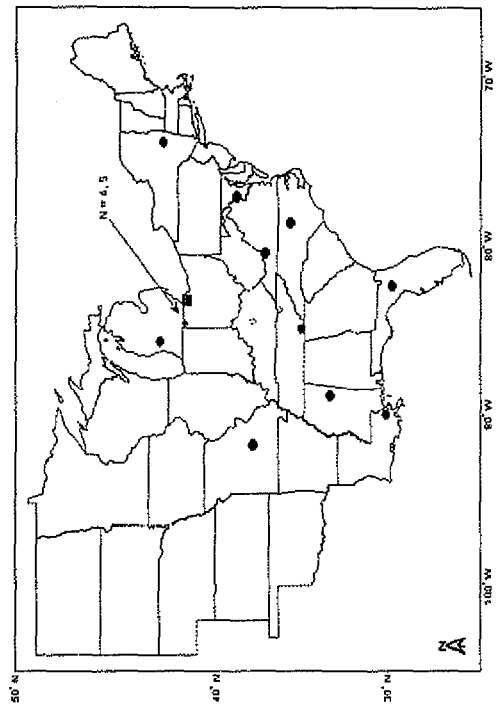
FIG. 15 is a map providing a Newtonian event location estimate for another case, according to one embodiment of the present application.
Figure 17:
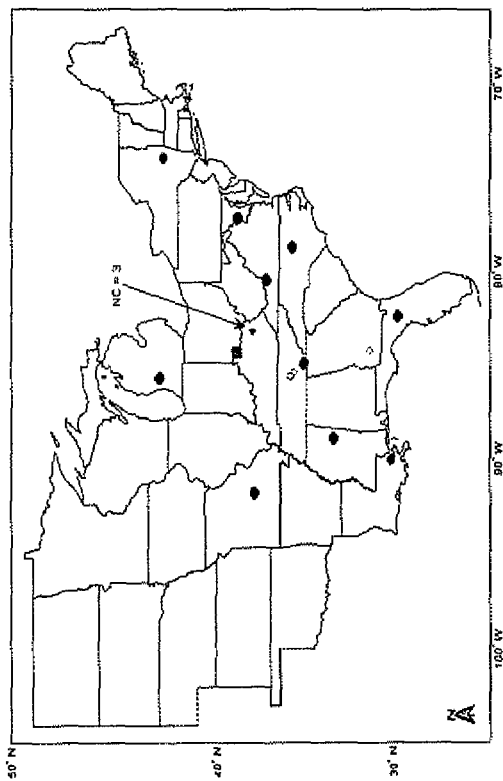
FIG. 17 is a map providing a Newtonian event location estimate for another case, according to one embodiment of the present application.
Figure 16:
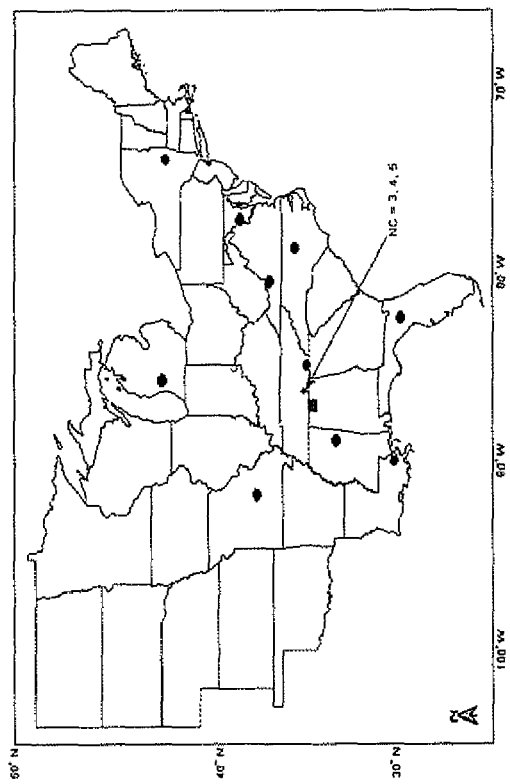
FIG. 16 is a map providing a Newtonian event location estimate for another case, according to one embodiment of the present application.

FIGS. 15, 16, and 17 show the results of this triangulation method. Each diamond represents a minimization with number of constraints, NC. The closest results are noted and the number of constraints active during that particular calculation.

The research presented here shows much promise for the future of power system event location or "triangulation." The methods presented in the above sections showed that, based upon an educated guess of the mean continuum velocity of perturbations in the electric grid, V, an accurate estimation of an event location is possible. However, sometimes an accurate guess of V is not tangible. The following reasons are believed to contribute to the inaccuracies of event location as presented: 1) Too few FDR output points per second; 2) Lack of sufficient FDR units; 3) The heterogeneous nature of the EUS grid; 4) The time- and condition-varying nature of the EUS grid; and 5) Lack of event progression repeatability due to system topology changes.

Each FDR is designed to sample frequency at 10 samples per second. If frequency perturbations actually travel between 100 mi/s and 1000 mi/s in the EUS, then a low error estimate could be between 10 miles and 100 miles. Furthermore, these error estimates can be multiplied by each additional degree of freedom that is added into the system. Another obvious problem is the lack of sufficient measurement units available. There are vast spaces in the above maps where there is very little indication of frequency. The solution of an overconstrained linear system of equations cannot account in any manner for the heterogeneous nature of the EUS grid in the LS sense.

Simulation Tests and Observations

The main objective here was to evaluate the effects of the distribution level on wide-area measurements of frequency. Generation drops within the transmission system were simulated and the frequency response of the system was monitored. For this analysis, the frequency of every bus within the transmission system and the distribution system was observed. By comparing the relative time delays associated with each portion of the power system the effects of the distribution level on wide area measurements can be assessed.

Figure 18:
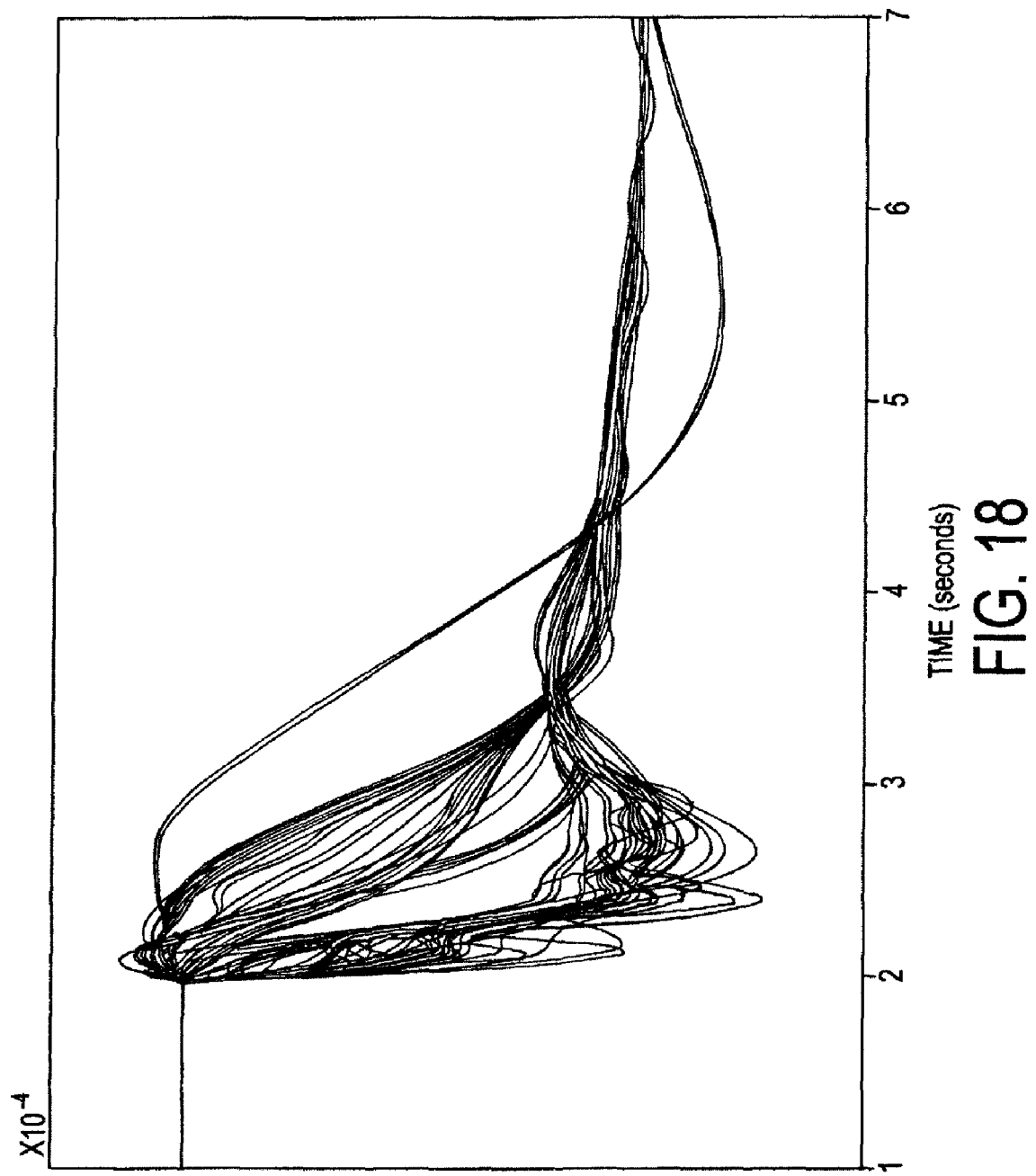
FIG. 18 is a graph illustrating a response to a generation drop in a radial distribution network, according to one embodiment of the present application.
Figure 19:
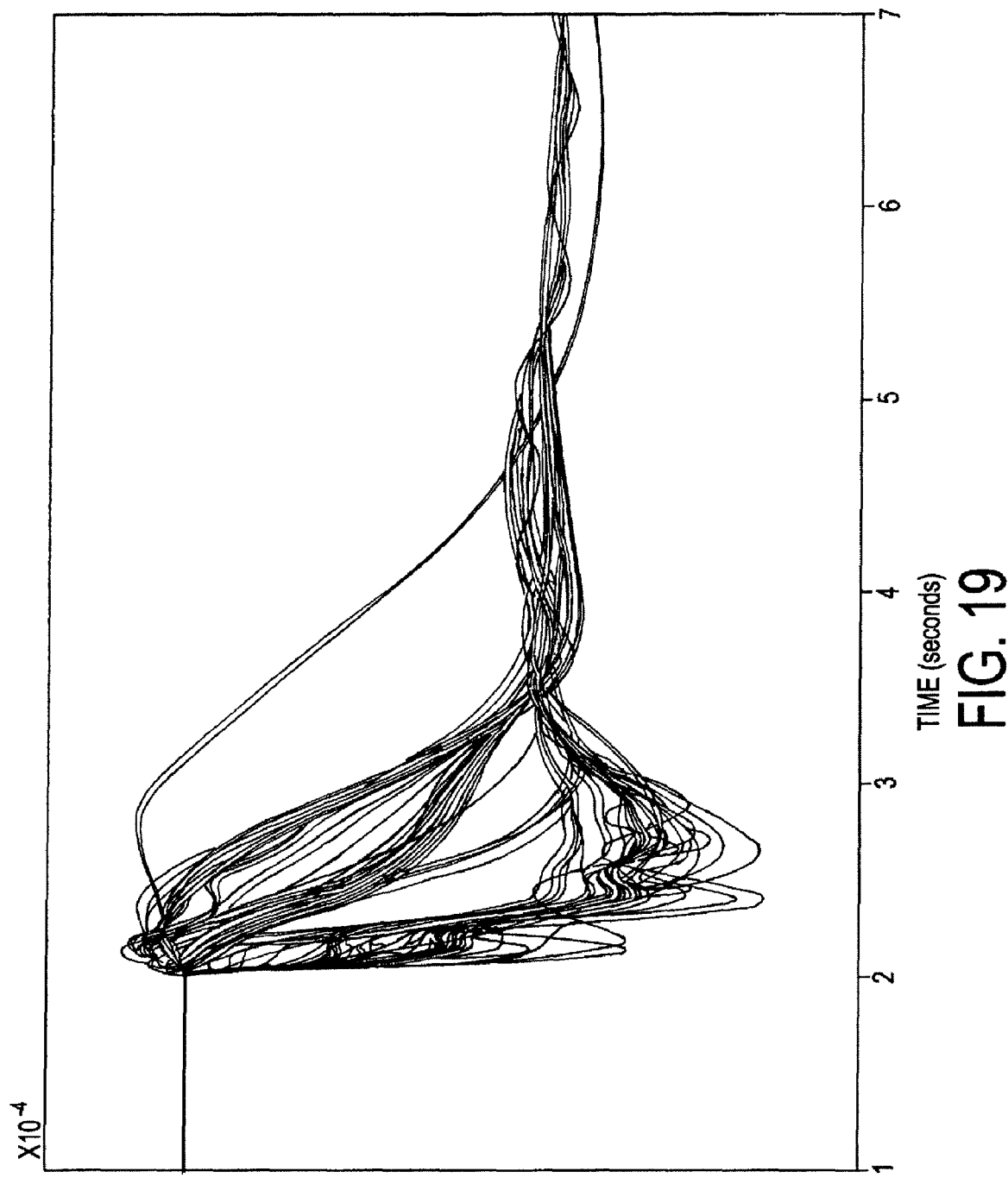
FIG. 19 is a graph illustrating a response to a generation drop in a mesh distribution network, according to one embodiment of the present application.

FIGS. 18 and 19 display the frequency at each bus after a generation drop of 1690 MW and 593.8 MVAR at bus 72 on the transmission system. The loss of generation occurred at a simulation time of 2 seconds. Two fairly distinct patterns are observed in the frequency response of the individual buses. Buses closer to the event tend to be characterized by larger and quicker drop in frequency accompanied by higher magnitude oscillations. Buses further from the event see the frequency drop later and have low magnitude frequency oscillations, if any. These results are as expected from previous work on the propagation of frequency and angle disturbances through a power system. Both of these generation drops look very similar since they are essentially simulations of two nearly identical systems. As expected the type of distribution network in one area should have very little if any effect on the dynamic response of the system as a whole.

Figure 20:
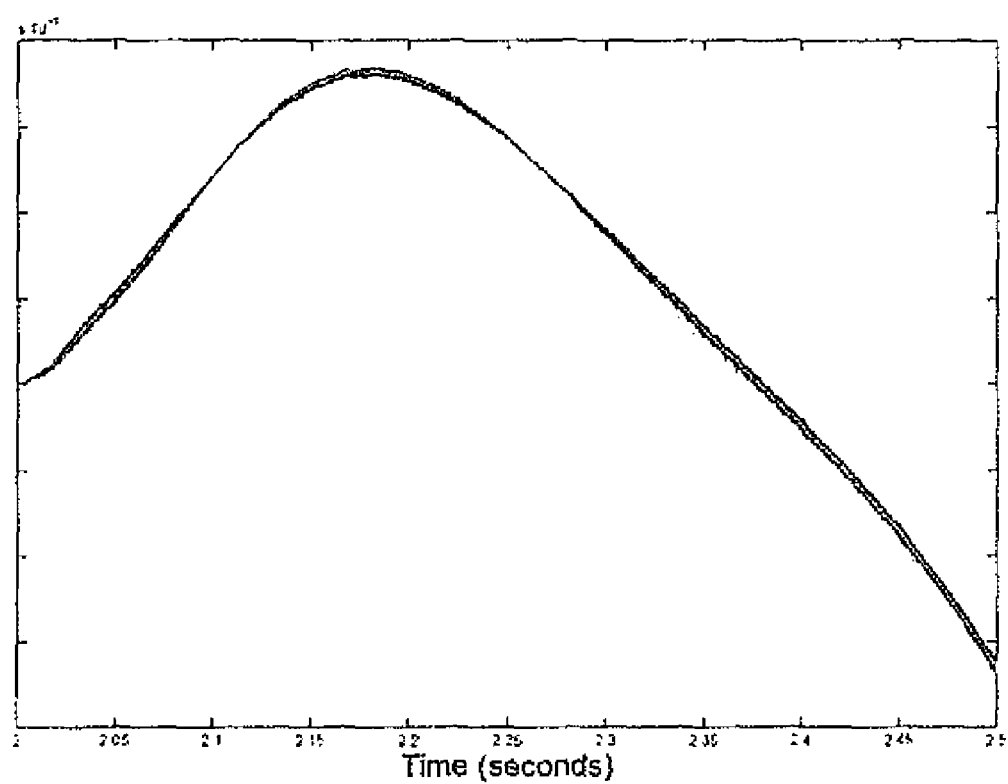
FIG. 20 is a more detailed view of a graph illustrating a response to a generation drop in a radial distribution network, according to one embodiment of the present application.
Figure 21:
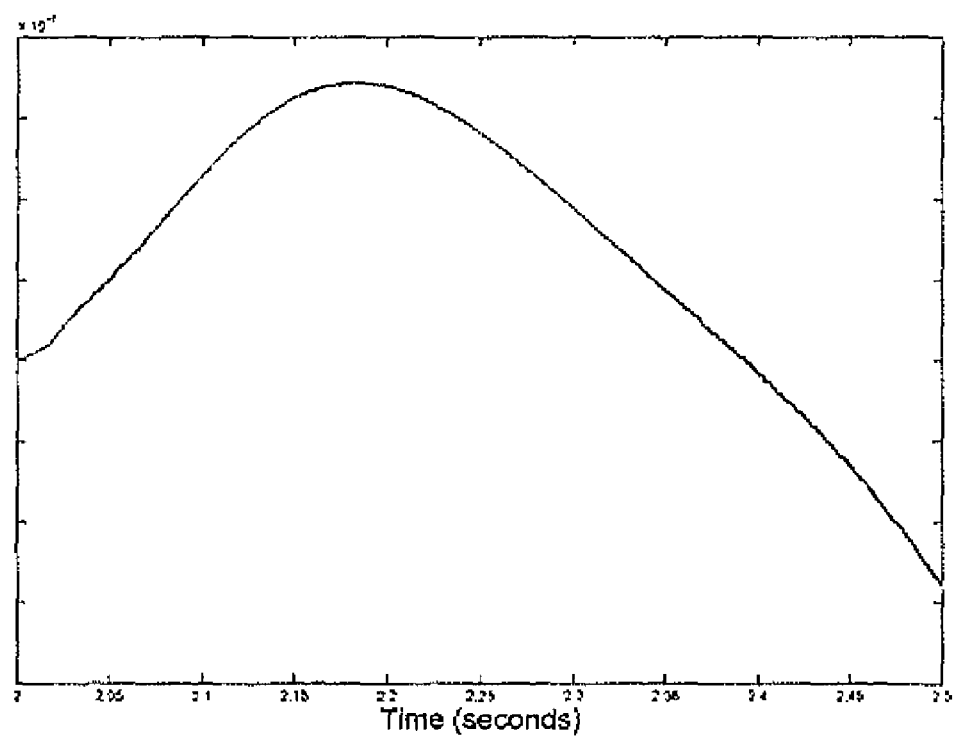
FIG. 21 is a more detailed view of a graph illustrating a response to a generation drop in a mesh distribution network, according to one embodiment of the present application.

Closer analysis of the radial distribution network during this generation drop simulation shows that all of its buses respond in nearly the same fashion, very little time delay is encountered as the disturbance travels from the head of the distribution network down the feeders. The first observation here is that when compared to the delay encountered between buses on the transmission level, the time delays in the distribution network are almost negligible. FIG. 20 shows a more detailed view of the distribution level buses immediately after the generation drop on bus 72. Much like the radial system the mesh distribution system buses responded with very little delay between the transmission level connections and the end of the feeder. In fact lower propagation delay was noticed due to the increased interconnectivity of the mesh network. The initial response of the mesh distribution system is shown in FIG. 21.

The diagrams for the load rejection further verify that the delays in the distribution system are negligible compared to the delays in the transmission system. The curves representing the frequency on the distribution buses are highlighted. It is apparent that the delays in the distribution system are still negligible compared to those of the transmission system.

The diagrams for the load rejection simulations further verify that the delays in the distribution system are negligible compared to the delays in the transmission system. It is apparent that the delays in the distribution system are still negligible compared to those of the transmission system.

Figure 22:
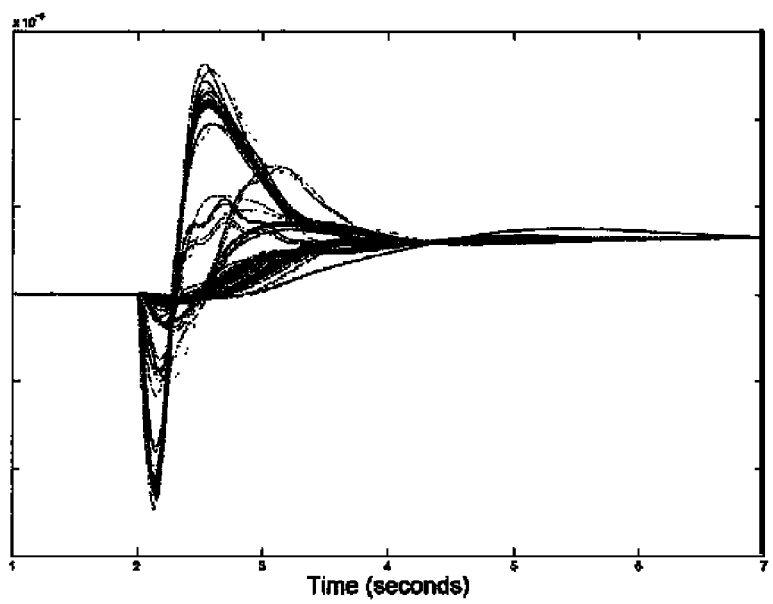
FIG. 22 is a graph illustrating a response to a load rejection in a radial distribution network, according to one embodiment of the present application.
Figure 23:
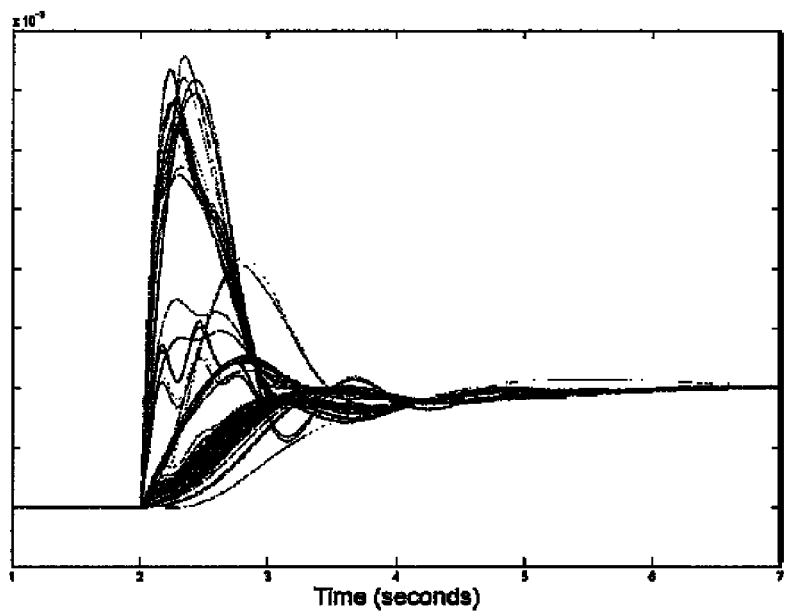
FIG. 23 is a graph illustrating a response to a load rejection in a mesh distribution network, according to one embodiment of the present application.

The main concern here is to evaluate the local distribution level effects on frequency measurements and to assess how a load rejection in one area appears to another area. The load rejection simulation results are presented in FIGS. 22 and 23 for the radial and mesh networks, respectively. Unlike the generation drops, the mesh and radial networks showed different responses to a load rejection. The radial network experienced a harsh reflection off of the end of the feeders which is noticeable in the large oscillation immediately after the event. Once again, buses further away from the event noticed reduced magnitudes in frequency change. Since the meshed network has a much greater degree of connectivity, the reflection is greatly reduced and the polarity of the frequency disturbance does not change as it did for the radial network. Another important observation here is that for both cases the distribution level and nearby transmission level buses experience the most prominent transient frequency changes. This observation shows that local distribution level disturbances are generally heavily filtered as they move out of the distribution level and into the transmission level. This is useful in terms of distribution level wide-area measurements because it shows that local event can be identified by large frequency changes in the local measurement device and drastically reduced disturbances in other units.

Comparison of Propagation Delays

The time delay for each bus was calculated using a frequency threshold. This threshold was set just below nominal frequency and the order in which the bus frequencies crosses this threshold was calculated for the simulation data. Each recorded frequency trace was analyzed to determine the point in time at which it crossed the frequency threshold. These crossing times were sorted chronologically and the delays between the event detection times at each bus were computed.

Representative branches were selected for each of the systems in question: the transmission system, the radial distribution system, and the mesh distribution system. Using the computed delay time along with known geographic and impedance information from the model the propagation speeds for the target branches were computed. The propagation speeds were computed based on geographic distance miles/sec and electric distance k$\Omega$/sec. Tables 4, 5, and 6 present the results of these calculations for the transmission, radial, and mesh networks, respectively. Those geographic speed entries left blank are between measurement points that are separated by a negligible distance.

TABLE 4

| From Bus | To Bus | Speed (miles/sec) | Speed (k$\Omega$/sec) |
| --- | --- | --- | --- |
| Hayden (47) | Emery (37) | 5859 | 8.8277 |
| John Day (12) | The Dalles (19) | 1011 | 7.9927 |
| Cholla (54) | Coronado (55) | 3317 | 7.6466 |
| Midpoint (27) | Burns (22) | 66582 | 7.1335 |
| Summer Lake (21) | Burns (22) | 1127 | 1.9134 |
| Colstrip (25) | Garrison (11) | 102484 | 32.990 |
| Palo Verde (59) | Navajo (61) | 8586 | 8.9072 |

TABLE 5

| From Bus | To Bus | Speed (miles/sec) | Speed (kΩ/sec) |
|---|---|---|---|
| 201 | 1204 | | 256.9 |
| 201 | 211 | 4578 | 9.7268 |
| 202 | 210 | 55923 | 189.5 |
| 210 | 419 | | 107.7 |

TABLE 6

| From Bus | To Bus | Speed (miles/sec) | Speed (kΩ/sec) |
|---|---|---|---|
| 7099 | 7102 | | 274.9 |
| 7119 | 8119 | | 405.3 |
| 7325 | 13001 | | 43.9 |

The speed of propagation when measured with respect to impedance tends to have a much lower variance than when measured with respect to distance. However, there is still a noticeable variation so this finding suggests that other factors (perhaps inertia, voltage level, loading, etc) play a part in speed of propagation also, but that is beyond the scope of this project. It can seen from the tables above that the electrical distance based speed of propagation (kΩ/sec) in distribution systems tends to be significantly higher than in transmission systems; therefore, the propagation delays will be much lower. In several cases, the time delay within the distribution system was virtually zero so the speed could not be calculated.

The delays in radial distribution systems are significantly larger than in mesh systems. If the simple hypothesis that speed of propagation is affected primarily by impedance is used, then this outcome is expected. Mesh systems will have many line segments in parallel; therefore, reducing the impedance between various points in the network, raising the speed of propagation, and decreasing the delay.

The maximum total delay in the radial and meshed distribution systems (the delay from the distribution level connection to the furthest load) are 5.98 ms and 1.15 ms, respectively. Transmission delays are usually much larger than those values as evidenced by the simulation data.

The analysis of the simulations show that the speed of frequency propagation in distribution systems is usually several hundred times larger than that of transmission systems. This means that the propagation delay imposed by the distribution system is practically insignificant when compared to the time it takes that same disturbance to travel across the transmission system. Some extreme cases were noticed in the simulations in which a measurement point on the end of a radial network made the time delay of arrival for the associated transmission level bus appear later in the detection order than it should. Overall, this analysis of simulation data showed that performing measurements at the distribution level of a power system introduced only a minimal amount of delay to the detection of system events.

These simulations showed that distribution level wide-area measurements can be used to accurately detect the times at which measurement points on a power system detect a system event. Furthermore, it was shown that the distribution level imposes no significant time delay on a traveling frequency disturbance. The simulations also showed that local distribution level disturbances are, in general, severely dampened by the time that they reach the transmission network. This notion is useful in that the values of various measurement points can be compared to determine which frequency disturbances are system wide and which are local.

Ongoing research along these lines can involve the creation of speed models for the power system that can be useful for determining event location using the algorithms as discussed in. Further research can also be done to determine how switching of loads on the distribution level affects the measured frequency and what effects, if any, this has on the wide-area frequency analysis.

Finally, it is important to be reminded that several factors affect the speed of traveling electromechanical waves. Two key factors are system impedance and system inertia. In discussions on wave speed, this paper focuses on the effects of system impedance but this concentration is in no manner intended to diminish the effects and relevance of inertia in similar studies.

Non-Parametric Event Location Methods

Information from several generator trip events with known generator locations provides the data that drives this section. The prevailing effort in this section is the mathematical estimation of the generator trip locations solely from frequency data observed by the relevant FDRs in the region of examination. Concepts taken from the fields of geometry, pattern recognition, and statistics are used in an attempt to compose a solution that deals with the vastly dynamic and heterogeneous nature of the region. The prevention of catastrophic power system failures relies on the timely triangulation of events such as generator trips.

Figure 24:
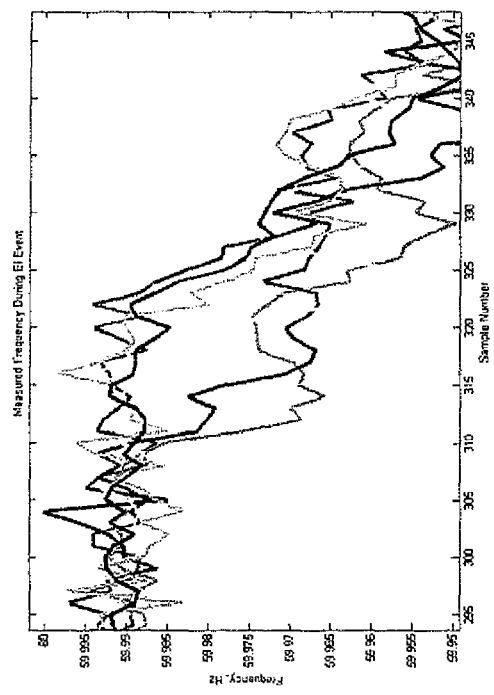
FIG. 24 is a graph illustrating an example of a standard generator trip frequency signature, according to one embodiment of the present application.

Previous work has treated frequency signatures in the Eastern and Western Interconnected Grids that resemble generator trips like the plot of FIG. 24. Without pursuing this example into too much depth, after a brief inspection of this figure the following loose assertions may be made:

1) The sensor corresponding to a first trace was the first to measure the disturbance.

2) The sensor corresponding to a last trace was the last to measure the disturbance.

3) Because of the general downward trend in frequency, the disturbance was caused by an event that at least gave the appearance of a generator trip. An excess amount of loading causes the frequency to sag.

Previous work in the field of power systems research has shown that such perturbations as seen in FIG. 24 travel throughout the power grid as an electromechanical wave. Such waves have finite speed and are clearly observable through the time delay of arrival (TDOA) in power system measurements. In this instance, one of the most critical metrics in power system monitoring, frequency, is used to observe this TDOA effect. Consider FIG. 25: It is worth noting at this point that the electric grid in the lower 48 United States is divided into three unsynchronized grids. The grids are the in the Western Electricity Coordinating Council (WECC), the Electric Reliability Council of Texas (ERCOT), and the Eastern Interconnected (EUS). This section deals exclusively with events in the EUS, but may be applied to any power grid systems.

Figure 26:
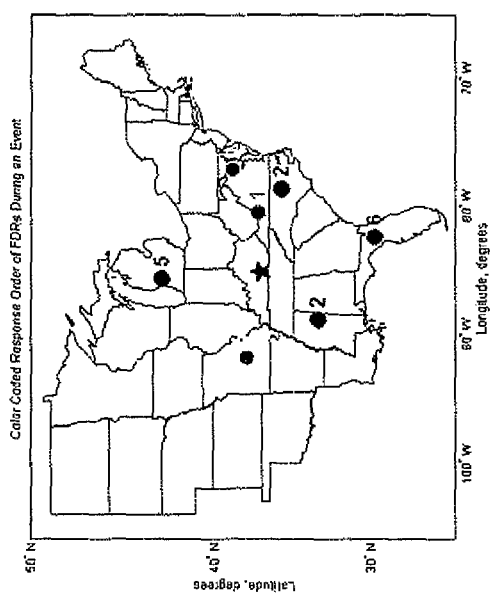
FIG. 26 is an illustration of how frequency perturbations might travel throughout the power grid, according to one embodiment of the present application.
Figure 25:
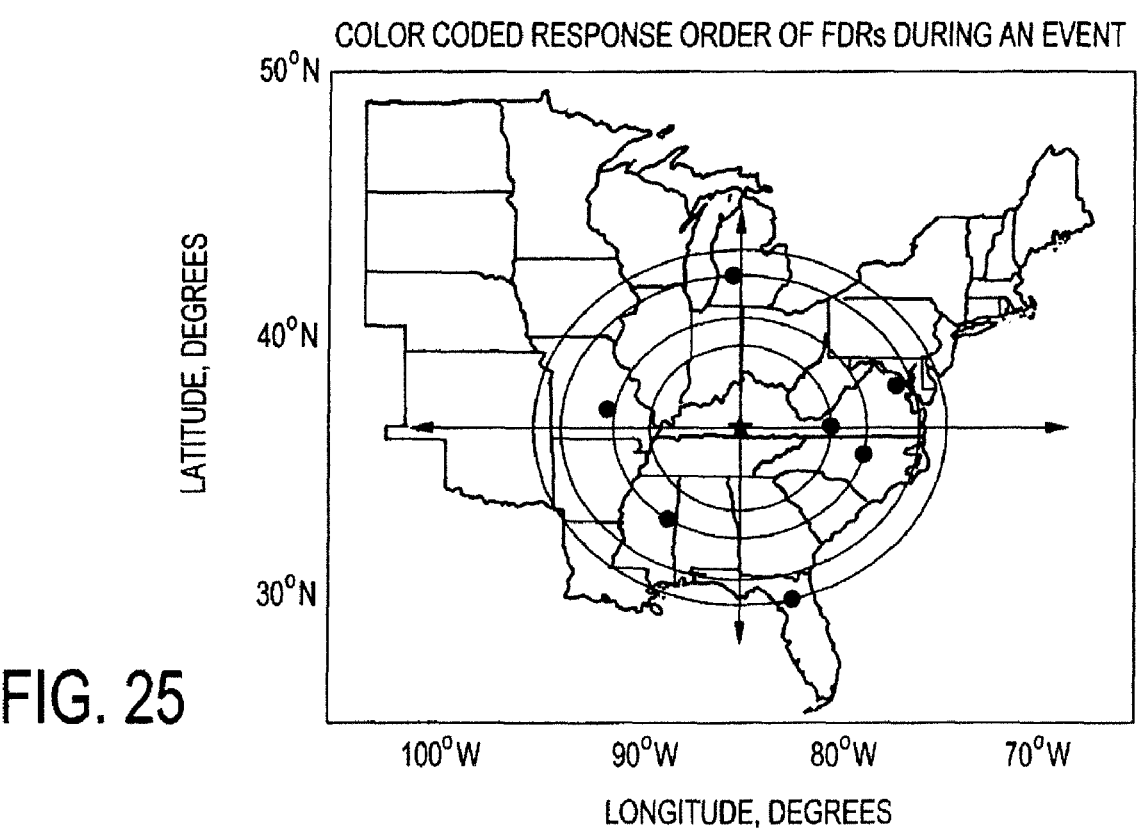
FIG. 25 is an illustration of how frequency perturbations might travel through a power grid, according to at least one embodiment of the present application.

In FIG. 25, the star represents the hypocenter of a power system event, perhaps a generator trip. The concentric rings represent the movement of the electromechanical perturbation wave caused by the event outward. The black dots represent the location of Frequency Disturbance Recorders (FDRs) in the EUS. Each FDR is indicated by the order in which the sensor detected the perturbation. Quite simply, when an event occurs, there is a delay or TDOA between its detection by different FDRs. Such an event detection order can be visualized in FIG. 26. The motivation, therefore, is to use tools from the field of pattern recognition, geometry, and statistics to determine the region of highest probability for the location of an unknown disturbance location. Available is historical information about power system events as measured by FNET. This information includes the actual event location event as verified after the event.

In the effort to create a pattern recognition program that is supposed to determine the region of highest probability for an actual event location, a few assumptions should be made as follows:

1) The electric grid is uniformly spread over the entire BUS and, therefore, electromechanical disturbances travel with uniform speed in every direction.

2) The grid is instrumented with a sufficient number of sensors to accurately observe any electromechanical disturbance.

These assumptions are perhaps not completely accurate in the instant situation since it is known that the grid is indeed not uniform. There are many holes and likewise many dense patches. Furthermore, in this section, only data from seven sensors (FDRs) is used. The motivation in making these assumptions and thus pursuing the methods herein is to show that even when these assumptions are grossly violated that progress can still be made towards a solution. Hence, the results presented here are worst-case scenario results. This statement is true since the number of FDRs in operation is steadily growing and it can soon be expected the EUS to be sufficiently instrumented. Once there are enough sensors in place, the uniformity of the grid will play a greatly lesser role.

The Half-Plane Method

Figure 27:
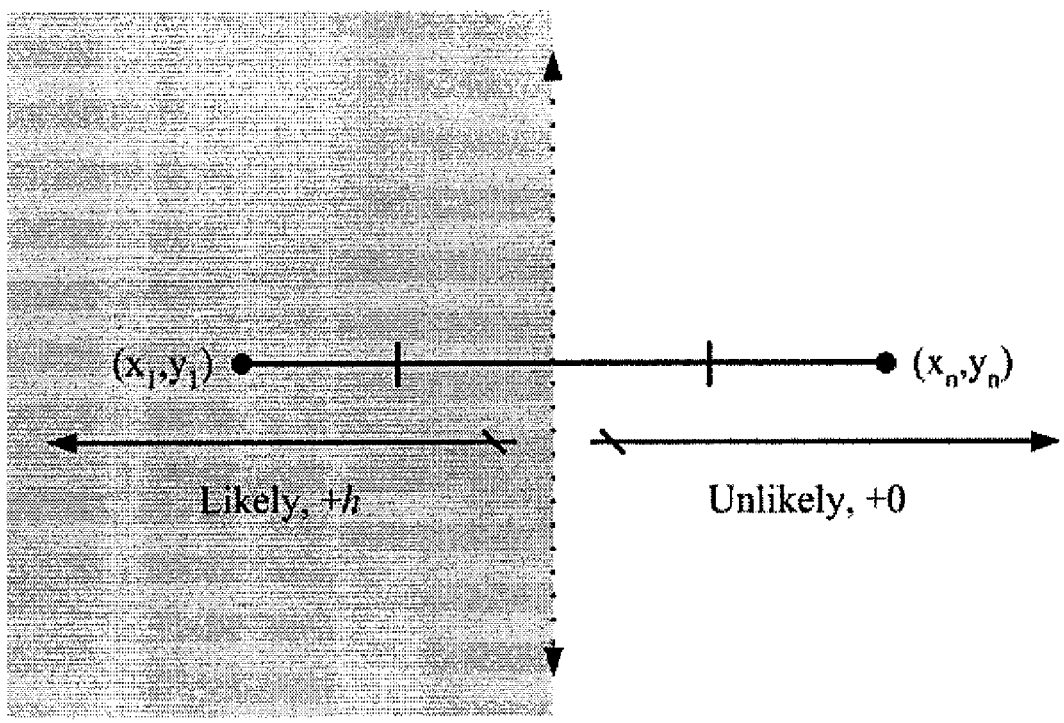
FIG. 27 is a figure of a plane containing two points, according to one embodiment of the present application.
Figure 28:
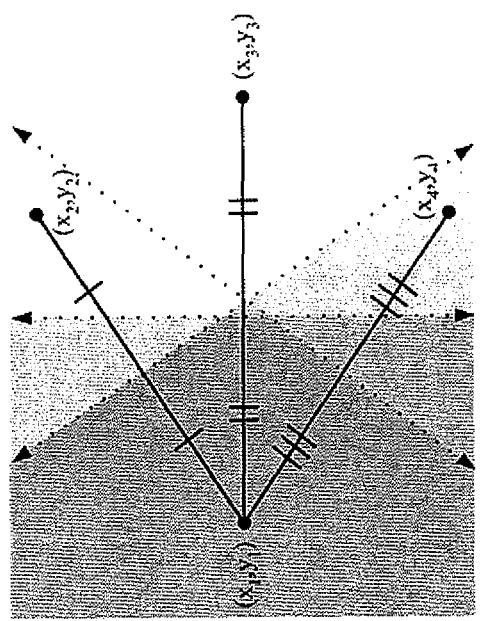
FIG. 28 is a figure of a plane containing four points, according to one embodiment of the present application.

Consider a plane containing two points as shown in FIG. 27. Suppose a wave, symmetrical in both directions on the level of the plane is observed by sensors at points $(x_1; y_1)$ and $(x_n; y_n)$ where the subscript of each point indicates the order in which the wave was detected. If the spread of the wave is indeed uniform in speed and propagation then it can be asserted that the origin of the wave is in the half-plane of the sensor that first detected the wave. This region is shaded in the picture. With just two sensors, the locus of all possible points of origin has been reduced by half. Perhaps there are more than just two sensors. Say, for example, we have four sensors as shown in FIG. 28. In this case three half-planes can be constructed and a region of overlap can be observed. If these half-planes are labeled $R_1$, $R_2$, and $R_3$, then the region of overlap can be described mathematically as:

$$R_{overlap} = R_1 \cap R_2 \cap R_3 \quad (16)$$

Figure 29:
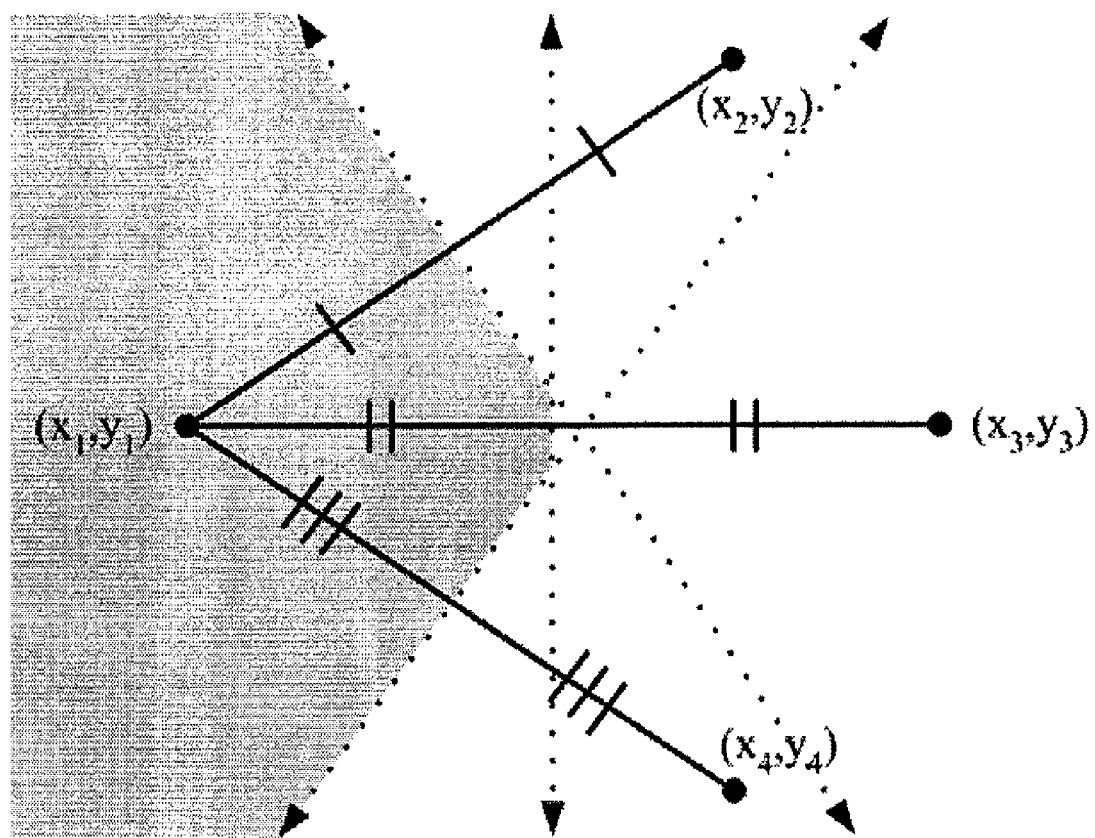
FIG. 29 is a figure of a plane containing four points, according to one embodiment of the present application.
Figure 30:
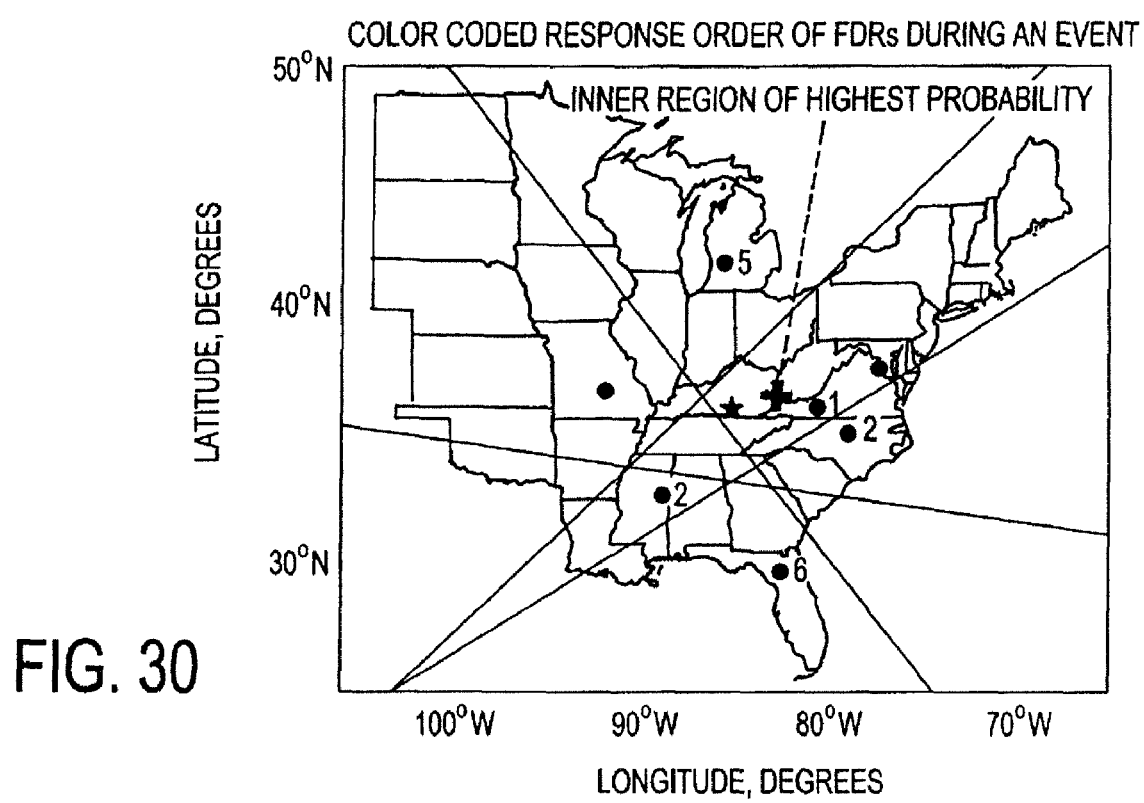
FIG. 30 is map showing lines representing half-planes in the eastern United States, according to one embodiment of the present application.

Continuing with the above logic, it can now be asserted with confidence (again assuming that the wave travels with even propagation) that the origin of the wave is in the overlapping portions of the planes of FIG. 28. This overlapping region, $R_{overlap}$, is shaded separately in FIG. 29. One can imagine that, as the number of sensors increases, $R_{overlap}$ tends to get smaller. Therefore, the higher the number of FDRs that respond to any arbitrary event in the EUS, the smaller the region of the supposed origin. Referring back to the EUS example, FIG. 30 shows the lines needed to construct the half-planes for the event ordering shown in FIG. 26. The star shows the actual location of the EUS disturbance, but the dot corresponding to the FDR at a particular location was the first to measure the disturbance in this example.

Parzen Window Approach

Figure 31:
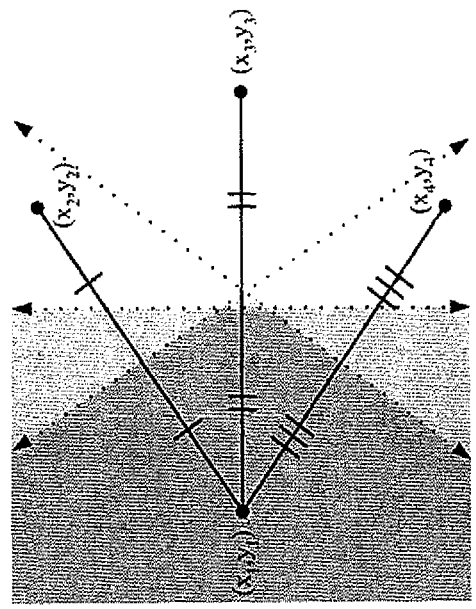
FIG. 31 is a figure showing shaded regions of probability, according to one embodiment of the present application.

The half-plane method has its advantages but is not very robust. If the detection order of the sensors is even slightly perturbed, the end result might be completely different. Therefore, as opposed to eliminating half-planes outright, regions of probability can be formed. This method is referred to as a Parzen window approach because a probability density can be estimated with a series of windowing functions. In this case these windowing functions are entire half-planes. As opposed to having the situation of FIG. 29, we can construct probability regions shown in FIG. 31. The regions shaded darkest correspond to regions of highest probability and the regions shaded lightest or not at all represent the regions of least probability. We have, in essence, created a probability density estimate that describes the probability of a detected disturbance having its origin in any given location. To create a probability density estimate as shown in FIG. 31, every point in the portion of the plane that is to be pared down is considered.

Figure 32:
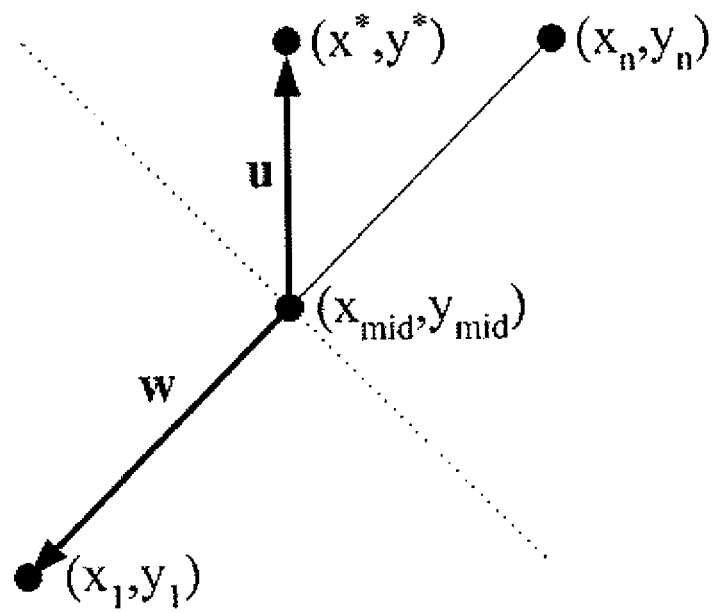
FIG. 32 is a figure showing vector relationships governing the half-plane method, according to one embodiment of the present application.

Furthermore, this consideration must be made for each pair of sensors $(x_1; y_1)$ and $(x_n; y_n)$. So for each sensor pair and each candidate point, $(x^*; y^*)$, in the grid (formed by a rectangular subsection of the plane of interest), vectors u and w are constructed as shown in FIG. 32. It is then the sign of the inner product of w and u that determines the height, h, added to the density estimate. It is important to note for computational reasons, the probability density estimate is assumed to be a discrete matrix in two dimensions, $H \in R^{m \times m}$, Hence, the density estimate can be updated for every sensor pair and candidate coordinate as follows:

$$H_k(i,j) = H_{k-1}(i,j) + h \cdot sgn(w^T u(i,j)) \quad (17)$$

It is key to note that the term "probability density," as used in this section, is used loosely This is because the resulting density matrix, H, is not normalized. Thus, in general, the integration of the "surface," does not converge to unity as is the case for a proper probability density estimate:

$$\int_{R_{overlap}} \int H(i,j) di\, dj \neq 1 \quad (18)$$

The process is useful in the creation of surface plots using H and the plots can be scaled however one wishes.

Parzen Window Example

Figure 33:
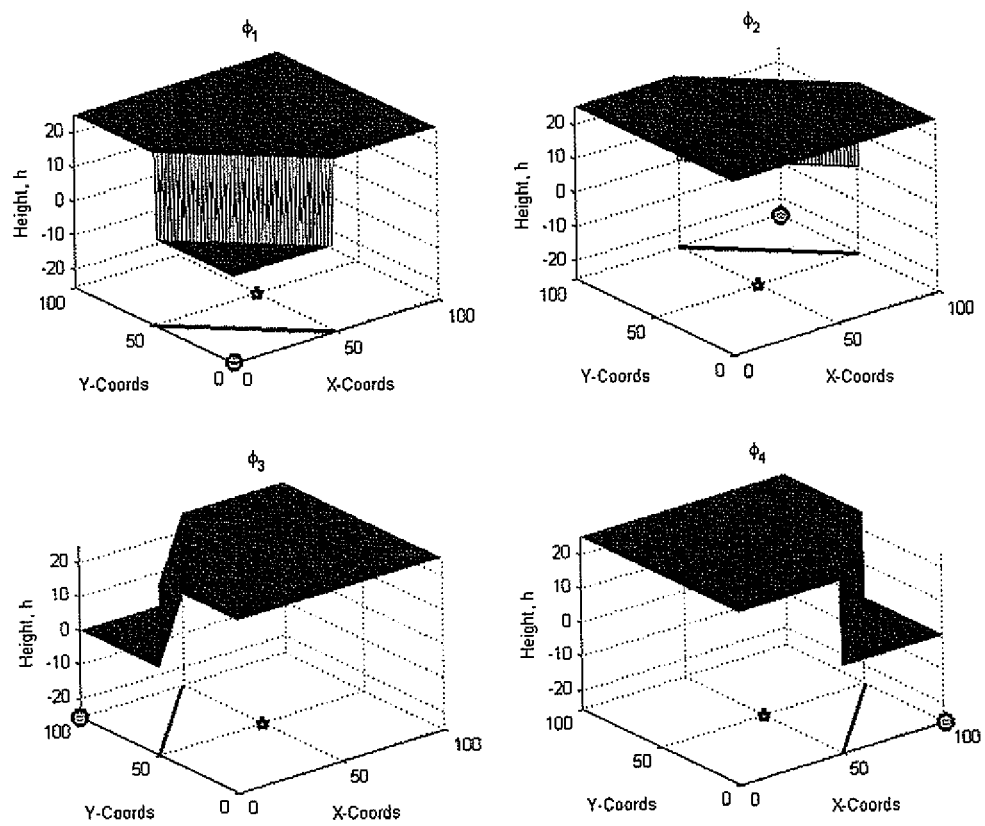
FIG. 33 is a set of graphs illustrating windowing functions for a Parzen window approach method, according to one embodiment of the present application.
Figure 34:
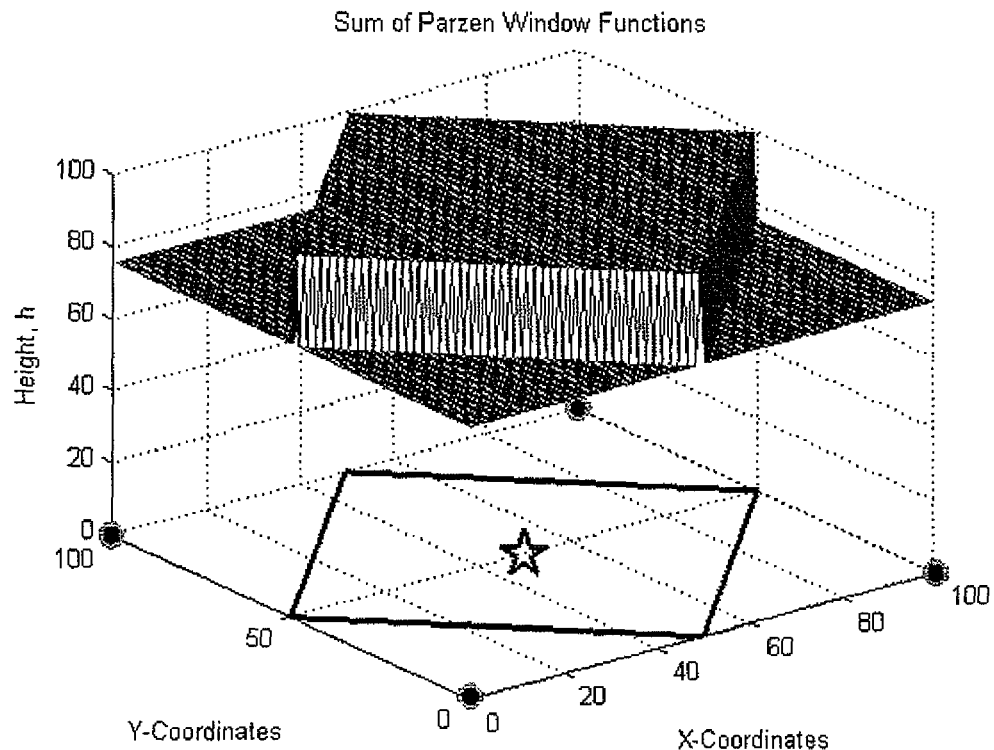
FIG. 34 is drawing showing the probability density estimate for the Parzen window approach method, according to one embodiment of the present application.

Let us assume that we have a set of five sensors as shown in FIG. 33. In this figure, each sensor is plotted in its own panel with a dot except for the first sensor to detect the disturbance which is represented as a star. Four windowing functions are created corresponding to each sensor pair $(x_1; y_1)$ and $(x_n; y_n)$. One can see that to each point in the half plane of the first sensor, a value, h, is added. Each of the windowing functions of FIG. 33 can be summed to create the probability density estimate as shown in FIG. 34. From FIG. 34, given the response of the sensors, probability regions can be created. For this figure, the region of highest probability is raised.

Parzen Window—Method 1

The Parzen Window Approach as presented is applied to real frequency data. The following pseudocode shows the basics of how this method is applied:

```
initialize mxm zeros matrix, H
for every FDR pair (x(1),y(1)),(x(n),y(n))
    w=[x(1)-xmid(n); y(1)-ymid(n)];
    for i=1:m
        for j=1:m
            u=[i-xmid(n); j-ymid(n)];
            if w'*u>0
                H(i,j)=H(i,j)+h;
            end
        end
    end
end plot(H)
```

This pseudocode is run for several ordering methods based on a variety of signal metrics. Also, a cumulative density estimate is formed by adding the density estimates calculated for each ordering method.

Figure 35:
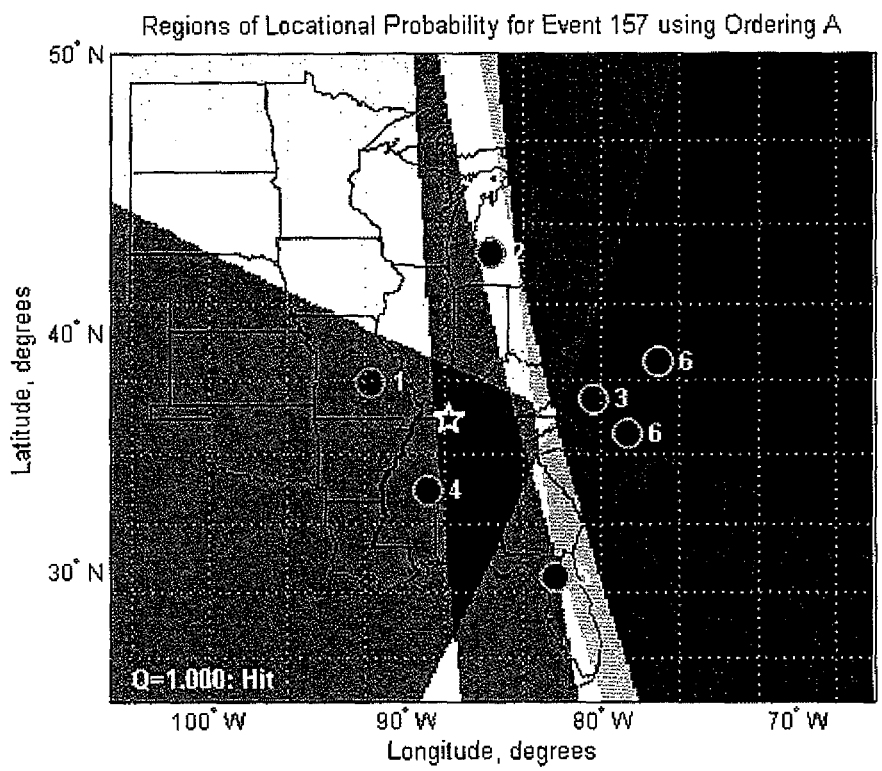
FIG. 35 is a drawing showing a probability density estimate for a particular generator trip using a first windowing method, according to one embodiment of the present application.
Figure 36:
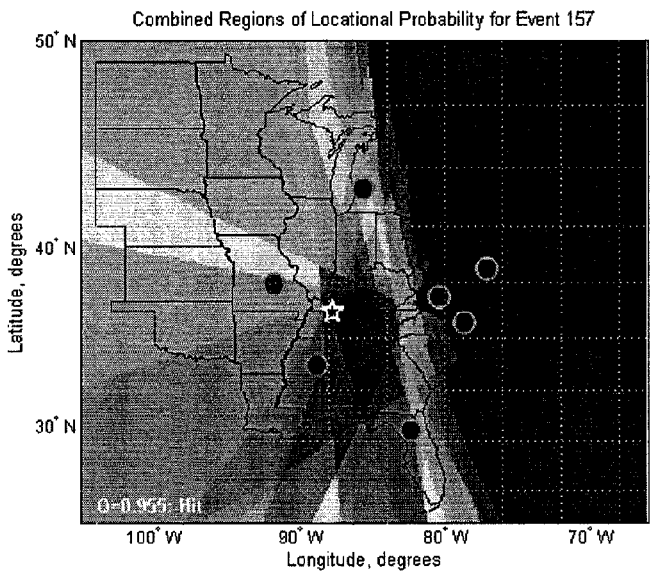
FIG. 36 is a drawing showing a probability density estimate for a particular generator trip using a second windowing method, according to one embodiment of the present application.

FIG. 35(a) shows a view of the probability density estimate from on top. The lowest points are in darker and the highest points are shifted away from the darker shading. Obviously points outside the EUS are of no relevance (for instance, points in the ocean) since there is no grid connectivity at these points. These points can be ignored. The actual location obtained from historical data is shown with a star. Ideally, this star should fall in the region of highest probability (i.e., the dark region above and below the star). The location of each FDR is indicated with a dot and beside each dot there is a number that corresponds to the order in which that sensor detected the event. FIG. 36 is the same except for the fact that this density is formed by summing the density estimates obtained using a variety of ordering methods.

To determine hits or misses, the result is considered a hit if the actual event location is in the upper quantiles of the formed probability density estimate. So, if $\beta > 0.5$, then the estimated probability density represents a hit. If $\beta < 0:5$, then the estimated density does not contain the actual location and is therefore a miss. A $\beta$-quantile of a data set X is any value x such that:

$$Pr(X \leq x) = \beta \quad (19)$$

For the density estimates $\beta$ is calculated as follows:

$$\beta = \frac{\int_{h \leq H(i_h, j_h)} \int H(i, j) \, di \, dj}{\int_{R_{overlap}} \int H(i, j) \, di \, dj} \quad (20)$$

The result, "Hit" or "Miss", is listed in the bottom left corner of each figure. The hit-to-miss ratio of this method was 5.727/1.273 out of a possible 7/0 when considering 154 events and responses. It is important to note that we could impose stricter standards on ourselves by increasing the quantile requirement threshold.

Parzen Window—Method 2

Figure 37A:
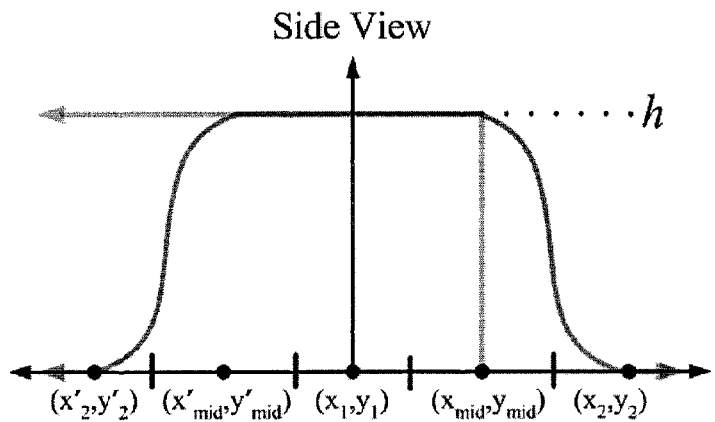
FIG. 37 provides a comparison of windowing functions, with FIG. 37(a) illustrating a side view and FIG. 37(b) illustrating a top view, according to one embodiment of the present application.
Figure 37B:
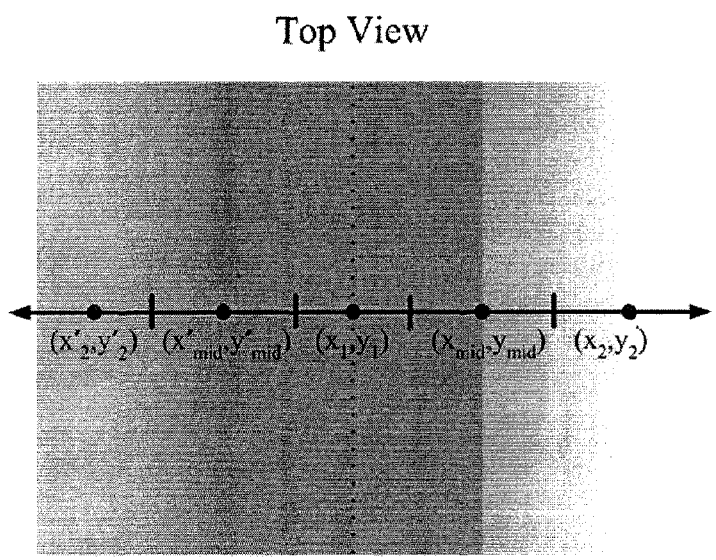

Suppose we do not want our windowing function to resemble a half-plane but rather some form of plateau function as shown in FIG. 37. One would not require such a windowing function in order to increase the accuracy or the probability density estimation but rather to avoid giving unnecessary weighting to points perhaps far from the first sensor to detect but on the correct side of the half-plane. For each pair of sensors, we can describe a density matrix, H as follows (using notation from FIG. 37):

$$(x_2', y_2') = (2x_1 - x_2, 2y_1 - y_2)$$

$$(x_{mid}', y_{mid}') = \left(\frac{x_1 + x_2'}{2}, \frac{y_1 + y_2'}{2}\right)$$

$$(x_{mid}, y_{mid}) = \left(\frac{x_1 + x_2}{2}, \frac{y_1 + y_2}{2}\right)$$

$$V_1 = \begin{bmatrix} x_1 - x_{mid} \\ y_1 - y_{mid} \end{bmatrix}$$

$$V_2 = \begin{bmatrix} x_1 - x_{mid}' \\ y_1 - y_{mid}' \end{bmatrix}$$

$$V_3 = \begin{bmatrix} x_{mid} - x_2 \\ y_{mid} - y_2 \end{bmatrix}$$

$$V_4 = \begin{bmatrix} x_{mid}' - x_2' \\ y_{mid}' - y_2' \end{bmatrix}$$

For every candidate point $(x^*; y^*)$, if $$V_1^T = \begin{bmatrix} x^* - x_{mid} \\ y^* - y_{mid} \end{bmatrix} > 0 \text{ AND } V_2^T = \begin{bmatrix} x^* - x_{mid}' \\ y^* - y_{mid}' \end{bmatrix} > 0$$

Then
$$H(x^*; y^*) = h$$
else if $$V_3^T = \begin{bmatrix} x^* - x_2 \\ y^* - y_2 \end{bmatrix} < 0 \text{ OR } V_4^T = \begin{bmatrix} x^* - x_2' \\ y^* - y_2' \end{bmatrix} < 0$$

then
$$H(x^*; y^*) = 0$$
else if $$V_3^T = \begin{bmatrix} x^* - x_2 \\ y^* - y_2 \end{bmatrix} > 0 \text{ AND } V_1^T = \begin{bmatrix} x^* - x_{mid} \\ y^* - y_{mid} \end{bmatrix} < 0$$

then $$H(x^*, y^*) = h \cdot \sin\left(\left(\frac{\pi}{2}\right) \cdot V_3^T \begin{bmatrix} x^* - x_2 \\ y^* - y_2 \end{bmatrix} \cdot \left(\frac{1}{\|V_3\|}\right)\right)$$

else if $$V_4^T = \begin{bmatrix} x^* - x_2' \\ y^* - y_2' \end{bmatrix} > 0 \text{ AND } V_4^T = \begin{bmatrix} x^* - x_{mid}' \\ y^* - y_{mid}' \end{bmatrix} < 0$$

Then $$H(x^*, y^*) = h \cdot \sin\left(\left(\frac{\pi}{2}\right) \cdot V_4^T \begin{bmatrix} x^* - x_2' \\ y^* - y_2' \end{bmatrix} \cdot \left(\frac{1}{\|V_4\|}\right)\right)$$

The algorithm for this section is similar to algorithm used for Method 1. The only difference is in the conditional statements of the inner loops. Also other vectors will need to be computed as outlined above. Therefore, the algorithm is not repeated here.

Figure 38:
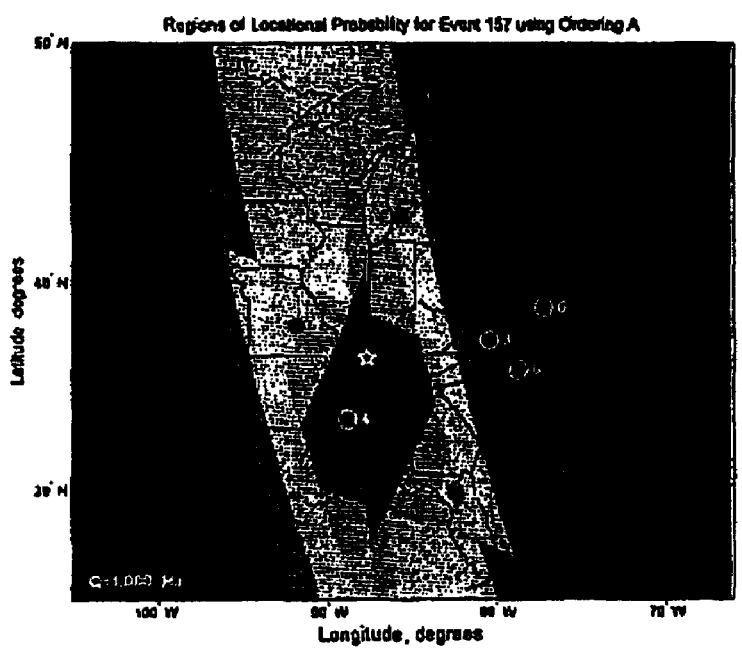
FIG. 38 is a drawing showing a probability density estimate for a particular generator trip using a first windowing method, according to one embodiment of the present application.
Figure 39:
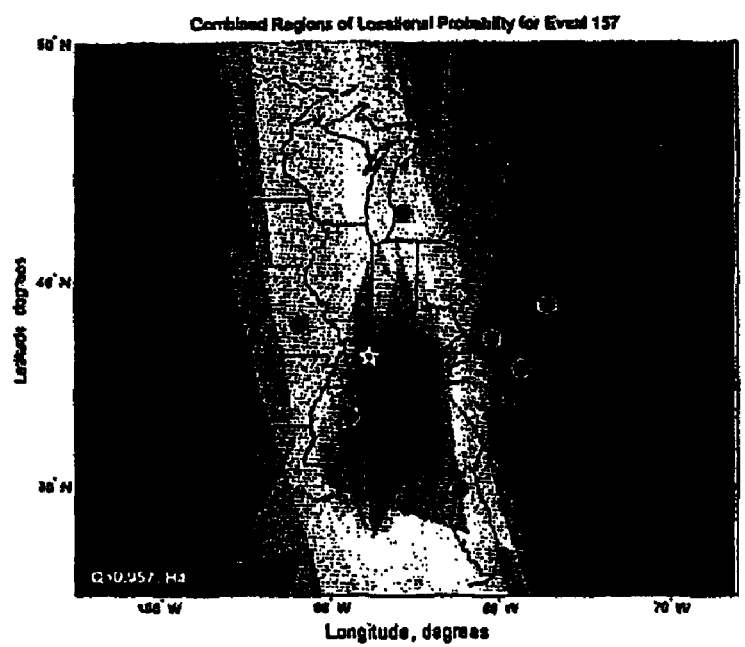
FIG. 39 is a drawing showing a probability density estimate for a particular generator trip using a second windowing method, according to one embodiment of the present application.

FIG. 38 shows a view of the probability density estimate from on top. The marks are the same as before. FIG. 39 is the same thing except for the fact that this density is formed by summing the density estimates obtained using a variety of ordering methods. The hit-to-miss ratio of this method was 4.545/2.455 out of a possible 7/0.

The results of the Parzen Approach are promising. Given the fact that we are attempting to locate a disturbance using only seven sensors over half of the United States, the results are satisfactory. As the number of FDRs increases it is plausible that the hit-to-miss ratio will improve. This will allow for an increase in the quantile threshold from 0.5 to perhaps upwards of 0.95. Future work will continue to focus in the area of non-parametric and less deterministic mathematics and pattern recognition.

It should be noted that the present description utilizes many specific examples, but the present invention is not so limited. While the networking of FDRs has been discussed with respect to Ethernet connections, other types of networking can also be employed to interconnect the FDRs. Many of the above discussed examples analyze the power grid in the eastern United States, but other regions can likewise be analyzed, in and outside the united States.

In addition, while the present invention has emphasized the monitoring of power grids, the present invention is also applicable to other systems where monitoring is important. The present invention may also be applicable to monitoring and analysis of weather data, where small monitoring stations are networked and changes are similarly analyzed. Similarly, other large systems, such as lightening detection systems, voting systems and traffic systems can also be examined and analyzed using the methods of the present invention.

The foregoing description and drawings should be considered as only illustrative of the principles of the invention. The invention may be configured in a variety of ways and is not intended to be limited by the preferred embodiments or methods. Numerous applications of the invention will readily occur to those skilled in the art from a consideration of the foregoing description. Therefore, the invention is not to be limited to the specific examples disclosed or the construction and operation shown and described. Rather, all suitable modifications and equivalents may be resorted to, within the scope of the invention as defined in the appended claims.

What is claimed is:

1. A method of detecting and locating events in a collective, the method comprising the steps of:
   receiving changes, caused by the event, at a series of recorders taking measurements in the collective at dispersed points of the collective;
   transferring data based on the changes to an information management system from the series of recorders through a communications network interconnecting the series of recorders and the information management system;
   analyzing the received data by the information management system by examining orders and patterns of receipt of the changes at the recorders; and
   triangulating a location of the event based on the orders and patterns of receipt of the changes by the recorders.

2. The method of claim 1, wherein the step of triangulating the locations comprises triangulating locations of disturbance events in a power grid comprising transmission line trips, generator trips and load rejections.

3. The method of claim 1, wherein the step of transferring data comprises transferring data from at least three recorders.

4. A system for detecting and locating a disturbance event within a power grid, said system comprising:
   a series of frequency disturbance recorders (FDRs) taking measurements in the power grid at dispersed points of the power grid;
   an information management system, configured to receive data from the series of FDRs and analyze the received data; and
   a communications network interconnecting the series of FDRs and the information management system;
   wherein said information management system is configured to examine orders and patterns of receipt of frequency changes at the FDRs in the data caused by the disturbance event and to triangulate a location of the disturbance event based on the orders and patterns of receipt of the frequency changes; and
   wherein the information management system is configured to apply a least squares analysis to the data of the orders and patterns of receipt of frequency changes at the FDRs to determine the location of the disturbance event.

5. The system of claim 4, wherein the information management system is configured to apply Newton's method for solving non-linear equations to the data of the orders and patterns of receipt of frequency changes at the FDRs to determine the location of the disturbance event.

6. The system of claim 4, wherein the information management system is configured to apply a gradient search to the data of the orders and patterns of receipt of frequency changes at the FDRs to minimize distances between a probable event location and the series of FDRs to determine the location of the disturbance event.

7. The system of claim 4, wherein the information management system is configured to compare the data of the orders and patterns of receipt of frequency changes at the FDRs with other data received from past events to determine the location of the disturbance event.

8. The method of claim 1, wherein the step of receiving changes comprises receiving changes in systems monitoring at least one of weather, lightening strikes, voting and traffic.

9. The method of claim 1, further comprising synching each recorder of the series of recorders to remaining recorders through communication with Global Positioning System satellites.

10. The method of claim 1, wherein the step of transferring data comprises sending data packets to the information management system through the communications network which are network time-stamped.

11. A method for detecting and locating a disturbance event within a power grid, said method comprising the steps of:
    receiving frequency changes, caused by the disturbance event, at a series of frequency disturbance recorders (FDRs) taking measurements in the power grid at dispersed points of the power grid;
    transferring data based on the frequency changes to an information management system from the series of FDRs through a communications network interconnecting the series of FDRs and the information management system;
    analyzing the received data by the information management system by examining orders and patterns of receipt of the frequency changes at the FDRs; and
    triangulating a location of the disturbance event based on the orders and patterns of receipt of the frequency changes;
    wherein the analyzing step comprises applying a least squares analysis to the data of the orders and patterns of receipt of frequency changes at the FDRs to determine the location of the disturbance event.

12. The method of claim 11, wherein the analyzing step comprises applying Newton's method for solving non-linear equations to the data of the orders and patterns of receipt of frequency changes at the FDRs to determine the location of the disturbance event.

13. The method of claim 11, wherein the analyzing step comprises applying a gradient search to the data of the orders and patterns of receipt of frequency changes at the FDRs to minimize distances between a probable event location and the series of FDRs to determine the location of the disturbance event.

14. The method of claim 11, wherein the analyzing step comprises comparing the data of the orders and patterns of receipt of frequency changes at the FDRs with other data received from past events to determine the location of the disturbance event.

15. The method of claim 11, wherein the analyzing step comprises applying a Parzen window approach to the orders and patterns of receipt of frequency changes at the FDRs to determine the location of the disturbance event.

* * * * *